United States Patent
Zhang et al.

(10) Patent No.: US 12,132,996 B2
(45) Date of Patent: Oct. 29, 2024

(54) ADAPTIVE-FLASH PHOTOGRAPHY, VIDEOGRAPHY, AND/OR FLASHLIGHT USING CAMERA, SCENE, OR USER INPUT PARAMETERS

(71) Applicant: Apple Inc., Cupertino, CA (US)

(72) Inventors: Bosheng Zhang, Sunnyvale, CA (US); Angelo M Alaimo, San Jose, CA (US); Kathrin Berkner Cieslicki, Los Gatos, CA (US); Paul M Hubel, Mountain View, CA (US); Frederic Cao, San Jose, CA (US); Bryan Dang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/934,494

(22) Filed: Sep. 22, 2022

(65) Prior Publication Data
US 2023/0098699 A1    Mar. 30, 2023

Related U.S. Application Data

(60) Provisional application No. 63/248,398, filed on Sep. 24, 2021.

(51) Int. Cl.
*H04N 23/72* (2023.01)
*H04N 23/71* (2023.01)

(52) U.S. Cl.
CPC ............. *H04N 23/72* (2023.01); *H04N 23/71* (2023.01)

(58) Field of Classification Search
CPC ........ H04N 23/72; H04N 23/71; H04N 23/10; H04N 23/61; H04N 23/69; H04N 23/74
See application file for complete search history.

(56) References Cited

U.S. PATENT DOCUMENTS 5,485,201 A   1/1996 Aoki
6,184,949 B1  2/2001 Cornelissen et al.
(Continued)

OTHER PUBLICATIONS

Anonymous, "Total internal reflection (TIR) lens and Legacy reflector", Retrieved from URL: http://cdnassets.hw.net/dims4/GG/eaebca3/2147483647/resize/876x%3E/quality/90/?url=http%3A%2F%2Fcdnassets.hw.net%2F5b%2F54%2Ffd55d90747c189 . . . , Nov. 15, 2016, pp. 1.

(Continued)

*Primary Examiner* — Twyler L Haskins
*Assistant Examiner* — Angel L Garces-Rivera
(74) *Attorney, Agent, or Firm* — Alexander A. Knapp; Kowert, Hood, Munyon, Rankin & Goetzel, P.C.

(57) ABSTRACT

A light source module includes an array of illumination elements and an optional projecting lens. The light source module is configured to receive or generate a control signal for adjusting different ones of the illumination elements to control a light field emitted from the light source module. In some embodiments, the light source module is also configured to adjust the projecting lens responsive to objects in an illuminated scene and a field of view of an imaging device. A controller for a light source module may determine a light field pattern based on various parameters including a field of view of an imaging device, an illumination sensitivity model of the imaging device, depth, ambient illumination and reflectivity of objects, configured illumination priorities including ambient preservation, background illumination and direct/indirect lighting balance, and so forth.

20 Claims, 30 Drawing Sheets

(56) References Cited

U.S. PATENT DOCUMENTS

| | | |
|---|---|---|
| 7,616,881 B2 | 11/2009 | Liang et al. |
| 8,886,027 B1 | 11/2014 | Shapir |
| 9,894,257 B2 | 2/2018 | Fournier |
| 10,094,242 B2 | 10/2018 | Holland et al. |
| 10,474,006 B2 | 11/2019 | Ariav |
| 10,942,423 B1 | 3/2021 | Coughenour et al. |
| 2007/0153495 A1 | 7/2007 | Wang et al. |
| 2008/0247743 A1 | 10/2008 | Liang et al. |
| 2009/0207622 A1 | 8/2009 | Tsuboi et al. |
| 2010/0188018 A1 | 7/2010 | Salm |
| 2010/0238344 A1 | 9/2010 | Tsai |
| 2010/0254692 A1 | 10/2010 | Kurt et al. |
| 2011/0103057 A1 | 5/2011 | Chen |
| 2011/0170296 A1 | 7/2011 | Heise |
| 2011/0176029 A1 | 7/2011 | Boydston |
| 2012/0154627 A1 | 6/2012 | Rivard et al. |
| 2012/0176663 A1 | 7/2012 | Zang et al. |
| 2013/0141013 A1 | 6/2013 | Kodama |
| 2013/0154514 A1 | 6/2013 | Liaw |
| 2013/0195435 A1 | 8/2013 | Yost et al. |
| 2013/0215611 A1 | 8/2013 | Wong et al. |
| 2013/0222865 A1 | 8/2013 | Iwamatsu |
| 2013/0258220 A1 | 10/2013 | Uehara |
| 2014/0063049 A1 | 3/2014 | Armstrong-Muntner |
| 2014/0078384 A1 | 3/2014 | Dohi |
| 2014/0160399 A1 | 6/2014 | Yang et al. |
| 2015/0009307 A1 | 1/2015 | Lee et al. |
| 2015/0009398 A1 | 1/2015 | Shih et al. |
| 2015/0069917 A1 | 3/2015 | Shih |
| 2015/0264779 A1 | 9/2015 | Olsen |
| 2016/0353012 A1 | 12/2016 | Kao et al. |
| 2017/0024846 A1 | 1/2017 | Nash et al. |
| 2017/0285307 A1 | 10/2017 | Kamm et al. |
| 2017/0324909 A1 | 11/2017 | Choi |
| 2018/0167539 A1* | 6/2018 | Fournier ................ H04N 23/51 |
| 2019/0236794 A1 | 8/2019 | Nash et al. |
| 2021/0191233 A1 | 6/2021 | Coughenour et al. |
| 2022/0114734 A1 | 4/2022 | Benson |
| 2023/0095000 A1 | 3/2023 | Zhang et al. |
| 2023/0101548 A1 | 3/2023 | Zhang et al. |

OTHER PUBLICATIONS

Anonymous, "Basics-of-opical-imaging-non-imaging-optics-15/638. jpg (638x451)", Retrieved from URL: http://image.slidesharecdn. com/basicsofopicalimaging130701042237phpapp02/95/basicsofopicalimagingnonimagingoptics15638.jpg?cb=1372653022, Nov. 15, 2016, pp. 1.

TCI, "Liquid Crystal Materials", Retrieved from URL: http://www.tcichemicals.com/eshop/en/US/category_index/00105/, Nov. 15, 2016, pp. 1-13.

Ki-Han Kim, et al., "Dual mode switching of cholesteric liquid crystal device with three-terminal electrode structure", Optics Express, vol. 20, No. 22, Oct. 22, 2012, pp. 1-6.

Hongwen Ren, et al., "Reflective reversed-mode plymer stabilized cholesteric texture light switches", Journal of Applied Physics, vol. 92, No. 2, Jul. 15, 2002, pp. 797-800.

Andy Ying-Guey Fuh, et al., "Studies of Polymer-Stabilizied Cholesteric texture films", In Display Technologies III, Proceeding of SPIE, vol. 4079, 2000, pp. 184-190.

"Electronically Variable Optical Diffuser", Downloaded from http://www.edmundoptics.com/techsupport/resource_center/product_docs/manl_87316.pdf, pp. 1-3.

G. Michael Morris, et al., "Engineered diffusers for display and illumination systems: Design, fabrication, and applications", Downloaded from http://www.physics.uci.edu/~isis/Yountville/Sales.pdf, pp. 1-11.

* cited by examiner

Identify a foreground object and a background region within the field of view of an imaging device. 1300

Identify a set of elements of an illumination array that contribute to illuminating the foreground object. 1310

Configure an illumination pattern for the illumination array where the set of elements emits light to illuminate the foreground object and elements other than the set of elements are disabled. 1320

Illuminate scene with light in accordance with the illumination pattern. 1330

Fig. 13

```
┌─────────────────────────────────────────────────────────────────┐
│ Identify a foreground object within the field of view of an     │
│ imaging device and a reflective object within the illumination  │
│ field of an illumination array. 2300                            │
└─────────────────────────────────────────────────────────────────┘
                                  ↓
┌─────────────────────────────────────────────────────────────────┐
│ Identify the orientation of the reflective object with respect  │
│ to the imaging device, illumination array and the foreground    │
│ object. 2310                                                    │
└─────────────────────────────────────────────────────────────────┘
                                  ↓
┌─────────────────────────────────────────────────────────────────┐
│ Identify a set of elements of the illumination array that       │
│ contribute to illuminating the foreground object and another    │
│ set of elements of the illumination array that will reflect off │
│ the reflective object to illuminate the foreground object. 2320 │
└─────────────────────────────────────────────────────────────────┘
                                  ↓
┌─────────────────────────────────────────────────────────────────┐
│ Determine a desired ratio of direct and indirect lighting for   │
│ the foreground object. 2330                                     │
└─────────────────────────────────────────────────────────────────┘
                                  ↓
┌─────────────────────────────────────────────────────────────────┐
│ Configure an illumination pattern for the illumination array    │
│ where the set of elements emits light to provide direct         │
│ illumination of the foreground object according to the desired  │
│ ratio and the otherset of elements emits light to provide       │
│ indirect illumination of the foreground object according to the │
│ desired ratio. 2340                                             │
└─────────────────────────────────────────────────────────────────┘
                                  ↓
┌─────────────────────────────────────────────────────────────────┐
│ Illuminate scene with light in accordance with the illumination │
│ pattern. 2350                                                   │
└─────────────────────────────────────────────────────────────────┘
```

*Fig. 23*

ADAPTIVE-FLASH PHOTOGRAPHY, VIDEOGRAPHY, AND/OR FLASHLIGHT USING CAMERA, SCENE, OR USER INPUT PARAMETERS

This application claims benefit of priority to U.S. Provisional Application Ser. No. 63/248,398, entitled "Adaptive-Flash Photography Using Camera and Scene Parameters," filed Sep. 24, 2021, and which is hereby incorporated herein by reference in its entirety.

BACKGROUND

Technical Field

This disclosure relates generally to light source modules which emit light, including, without limitation, flash modules used to illuminate subjects in images captured by a camera device.

Background

For small devices, including devices which include one or more miniature cameras, it is common to include in such devices a light source module, which illuminates at least a portion of a scene located within a field of view of the camera of the device. Such cameras and light source modules can be included in a larger electronic device, including a mobile electronic device, which can include a mobile telephone, smartphone, notebook, etc.

A light source module, which may also be referred to as a "flash" module, "strobe" module, etc., emits light which illuminates a space external to the light source module. The illuminated space may include a camera field of view, thereby illuminating subjects within the camera field of view for images of said subjects captured by the camera.

In some cases, a camera may be designed to capture images of scenes in the camera's field of view that include objects that are at various distances away from the camera, for example via a telephoto lens system or a wide-angle lens system. In some cases, a camera system may be designed to capture images of objects in a scene at a particular distance away from the camera in one of multiple camera modes, such as a wide-angle mode or a telephoto mode. Also, a camera may be designed to capture images of an object at a particular distance away from the camera in any number of multiple zoom levels supported by the camera. In such cases, a light source module that does not adjust for zoom levels, adjust for distances to objects or adjust for different camera modes may result in inadequate, insufficient, or uneven illumination of a scene to be captured by the camera.

In some cases, a scene may include multiple objects that are at different distances away from the camera and that include different ambient lighting and reflectivity characteristics. In such cases, a light source module that does not adjust illumination across an illumination field may result in uneven illumination of a scene to be captured by the camera.

SUMMARY

Some embodiments provide a mobile computing device which includes a camera arrangement with one or multiple lens systems. With one lens system, there may be different digital zooms achieving different fields of views. With multiple lens systems, each may have different fields of view, such as a wide-angle lens system, a telephoto lens system, and an ultra-wide-angle lens system. A field of view of an image captured by the camera arrangement may be based on a combination of the fields of view of the different lens systems, such as a combination of a field of view of a wide-angle lens system and a field of view of a telephoto lens system, or a combination of a wide-angle lens system and an ultra-wide-angle lens system. In addition, a camera arrangement may be configured to capture photos at multiple zoom levels using a combination of the different lens systems, such as a combination of the telephoto lens system and the wide-angle lens system. For example, a camera arrangement may include a camera with a telephoto lens system and another camera with a wide-angle lens system, or may include a camera configured to operate both a telephoto lens system and a wide-angle lens system to achieve intermediate optical zoom levels between a full optical wide-angle mode and a full optical telephoto mode. The mobile computing device also includes a light source module embedded in the mobile computing device or coupled with the mobile computing device. The light source module includes an array of illumination elements configured to emit light through a projection lens. For example, the one or more illumination elements may be one or more light emitting diodes (LEDs).

The mobile computing device includes a controller configured to determine respective amounts of light to be emitted from individual ones of the array of illumination elements to focus the illumination field such that the illumination field of view optimizes illumination of the scene. Note that in some embodiments, the controller may determine an amount of current to be directed to respective ones of the illumination elements, wherein the amount of light emitted from a given illumination element is proportional to the current supplied to the illumination element. In some embodiments, a camera arrangement field of view resulting from a combination of a wide-angle field of view and a telephoto field of view may have a pyramid shape with a focal point of the pyramid being the lens or lenses of the lens systems of the camera arrangement.

Different scenes of objects at different distances within the camera arrangement field of view may have quadrilateral shapes. As a distance from the camera is increased in a composite camera arrangement field of view, scenes corresponding with cross-sections of the pyramid composite camera arrangement field of view at the increasing distances may have quadrilateral shapes with increasing areas. A controller may determine an illumination pattern for a composite camera arrangement field of view based on a level of inclusion of a telephoto field of view or a wide-angle field of view in the composite field of view. The level of inclusion may vary in a spectrum from the composite camera arrangement field of view being primarily based on the wide-angle field of view to the composite camera arrangement field of view being based primarily on the telephoto field of view. In some embodiments, a controller may be configured to receive information indicating a camera optical zoom level, a camera mode, such as a wide-angle mode or a telephoto mode, a digital zoom level, an estimated distance to objects in a scene to be captured by the camera, or other camera information, such as auto-focus information. The information may correspond to a level of inclusion of a wide-angle field of view or a telephoto field of view in a composite camera arrangement field of view that varies. The controller may further be configured to infer the level of inclusion of the wide-angle field of view or the telephoto field of view in the composite camera field of view based on the optical or digital zoom level of the camera, the distance to the scene, and/or the camera mode.

In some embodiments, the illumination field may illuminate objects in a scene in the composite camera arrangement field of view at a particular distance such that corner portions of the scene, which comprises a quadrilateral cross section passing through the composite camera arrangement field of view at the particular distance, are illuminated to a substantially similar degree as a center portion of the quadrilateral scene.

For a given image capture operation, the controller may further configure the illumination pattern based on ambient lighting, depth of objects in the scene, reflectivity of objects, illumination sensitivity of the imaging device, and so forth. In some embodiments, the controller may further be configured to determine an overall illumination intensity for the array of illumination elements and cause one or more illumination elements of the array of illumination elements to emit light according to the determined overall illumination intensity. In some embodiments, an overall illumination intensity for the array of illumination elements may be determined based, at least in part, on a distance from a light source module to objects in a scene in a camera field of view to be illuminated. Also, in some embodiments, an overall illumination intensity for one or more illumination elements may further be determined based, at least in part, on ambient lighting conditions for a scene to be illuminated. In some embodiments, an overall amount of current allocated to the light source module may be limited, and the controller for the light source module may strategically distribute current to illumination elements of the illumination array such that some illumination elements are supplied more current than others. The controller may determine a distribution of current to the illumination elements of the light source module in a way that optimizes how light is projected out into the scene, for example to compensate for distance, ambient lighting conditions, reflectivity differences, lens effects, background lighting conditions, etc.

BRIEF DESCRIPTION OF THE DRAWINGS

FIG. 13 is a flow diagram illustrating a method for providing minimal disturbance using an illumination array and a projection lens, according to some embodiments.

FIG. 23 is a flow diagram illustrating a method for providing indirect flash using an illumination array and a projection lens, according to some embodiments.

Figure 1:
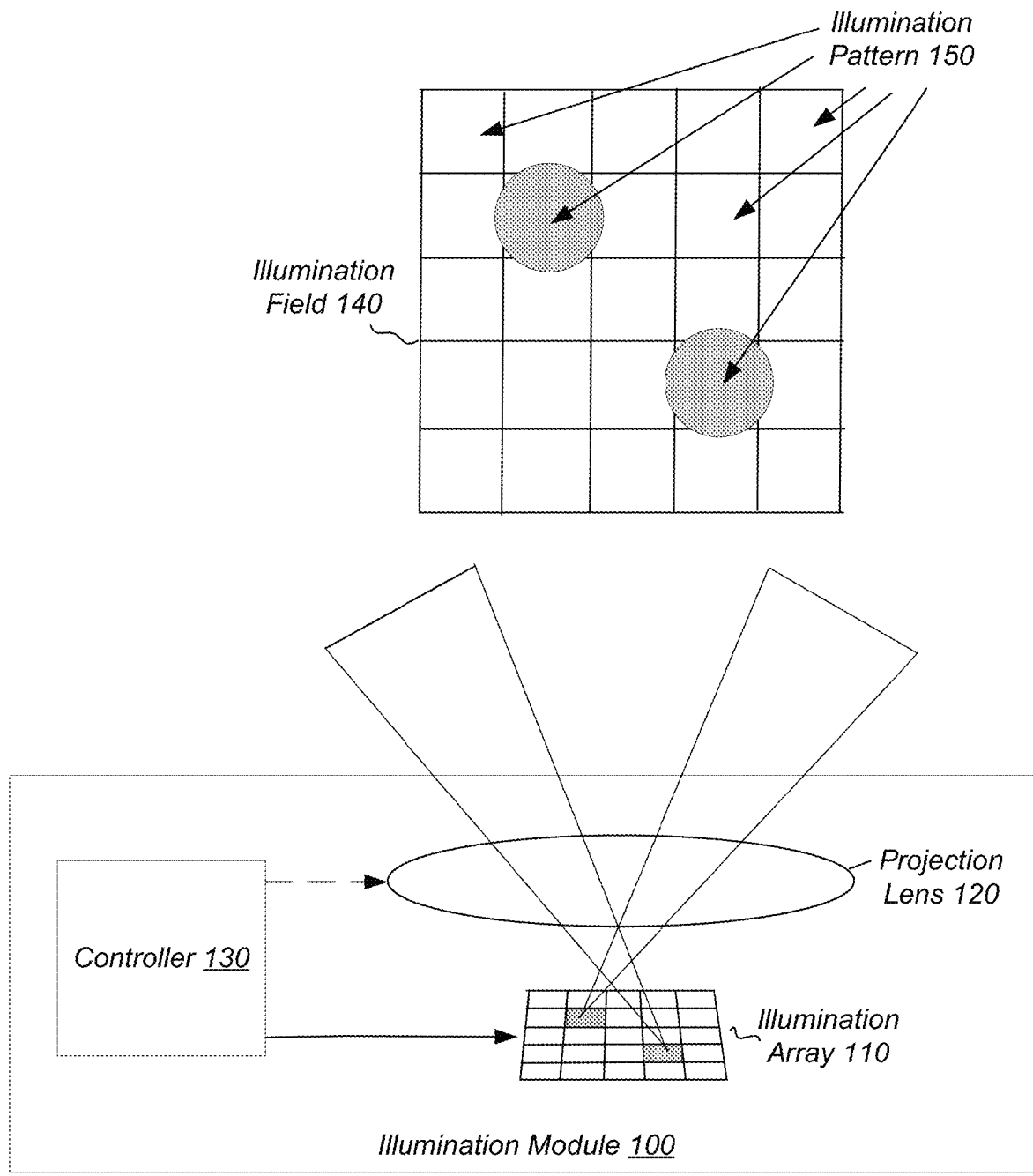
FIG. 1 illustrates a light source module with adjustable illumination array and projection lens, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units. . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide a light source module with adjustable illumination array and projection lens such that light emitted from the array of illumination elements forms a light field of a particular illumination pattern with variable illumination intensities for portions of the illumination pattern. The light source module may emit a pyramid shaped beam of light with square or rectangular cross-sections and may be configured to project a light pattern that corresponds to a pyramid shaped composite field of view of one or more cameras associated with the light source module. The light pattern may have variable light intensities within the pyramid shaped beam of light such that some portions of a square or rectangular cross-section are more illuminated than other portions. A controller for the light source module may determine such variable illumination intensities, based on measured scene conditions, as further discussed herein.

The composite camera field of view may have rectangular or square shaped cross sections at different distances (e.g., scenes) within the composite camera field of view. The composite field of view may be a combination of a wide-angle field of view of a wide-angle lens system and a telephoto field of view of a telephoto lens system. Also, the composite field of view may continuously vary over a spectrum from nearly fully wide-angle to nearly fully telephoto based on a level of inclusion of the wide-angle field of view or the telephoto field of view in the composite camera field of view. For example, in some embodiments, a first camera may include a telephoto lens system and a second camera may include a wide-angle lens system, in such embodiments the first and second camera may capture composite images that use some image data from each of the two cameras. In such embodiments a composite field of view of the two cameras may vary based on a level of inclusion of image data from each of the two cameras in a composite image. In other embodiments, a common camera may include an aperture associated with a telephoto lens system and an aperture associated with a wide-angle lens system and may combine light or image data from both the wide-angle lens system and the telephoto lens system to form a composite image. A level of inclusion of light or image data from the wide-angle lens system or the telephoto lens system may be adjustable such that a level of inclusion of a telephoto field of view or a wide-angle field of view in a composite camera field of view may be adjusted.

Furthermore, the light source module may include or interact with a controller that is configured to adjust individual elements of an illumination array based, at least in part, on variable levels of intensity of light to be projected into portions of a scene, a determined light field pattern to be used to illuminate the scene and a wide-angle lens system field of view or a telephoto lens system field of view used in a composite camera field of view to capture an image of the scene.

In some embodiments, a light source module may include or interact with a controller configured to determine an estimated distance to objects in a camera field of view and adjust individual elements of an illumination array based on the distance to the objects in the camera field of view such that light emitted from the light source module substantially illuminates the one or more objects in the scene that are within the camera field of view. For example, when an estimated distance to one or more objects in a scene in a camera field of view is a shorter distance, a controller may adjust individual elements of an illumination array so that light is evenly spread across the closer scene in the camera field of view.

Some embodiments may include a controller that estimates a distance to an object in a scene in a field of view of a camera based on information received from the camera. For example, a controller may use, zoom level information and/or autofocus information from a camera to estimate a distance to one or more objects in a scene to be captured by the camera. In some embodiments, a controller for a light source module may be included with a controller that also controls a camera associated with the light source module. In some embodiments, a controller for a light source module may be separate from a camera controller and may receive information from a camera controller, such as zoom information and/or autofocus information. In some embodiments, a light source module and/or mobile device comprising a light source module may include one or more sensors that directly measure distance, such as a LiDAR sensor, laser and reflected light sensor, or other type of depth sensor.

In some embodiments, a controller for a light source module may also determine an illumination intensity for illumination elements of a light source module. For example, a controller for a light source module may use an estimated distance to an object in a scene to be captured by the camera, camera sensor sensitivity settings, such as camera ISO settings or shutter speeds, and/or ambient lighting conditions to determine an illumination intensity for one or more illumination elements of a light source module. For example, under darker light conditions, a camera may select a certain ISO setting that corresponds with darker conditions and a controller may select illumination settings for illumination elements of a light source module that correspond to a higher illumination intensity to illuminate the darker field of view. The selected illumination settings may be greater than would be selected for a field of view with brighter lighting conditions. In some embodiments, the controller may independently determine illumination intensity settings for individual ones of an array illumination elements of the light source module based on the distance to the object in the scene in the camera field of view, light conditions of the scene in the camera field of view, etc. In some embodiments, different illumination intensities for different illumination elements of the array may be determined based on different distances to objects in the scene, wherein the different ones of the illumination elements illuminate different portions of the scene comprising the objects at different distances.

Light Source Module with Adjustable Illumination Array and Projection Lens

FIG. 1 illustrates a light source module with adjustable illumination array and projection lens, according to some embodiments. An illumination module 100 may include an illumination array 110 comprising a plurality of illumination elements, such as an array of light emitting diodes (LEDs) or laser diodes. These illumination elements may, in some embodiments, be arranged in a two-dimensional matrix such that individual illumination elements correspond to a two-dimensional matrix of zones in an imaging scene.

Light emitted by individual ones of the illumination elements may, in some embodiments, be collectively projected through a shared projection lens 120 to generate an illumination field 140. The shared projection lens 120 may be implemented in any number of configurations. For example, as shown in FIG. 1 a simple, single element lens may be used. In this example, light emitted by individual ones of the illumination elements may be inverted, both horizontally and vertically, when projected onto the illumination field 140. In other projection lens embodiments, these inversions may not occur and the controller 130 may maintain a mapping of individual ones of the illumination elements of the illumination array 110 to positions in an illumination pattern 150 of an illumination field 140 so as to control the specific illumination pattern 150. In other embodiments, the shared projection lens 120 may be a multi-element lens and individual lenses may be of a conventional shape or may include alternative shapes such as discussed below in FIG. 25A. Furthermore, in some embodiments the lens 120 may be of a fixed type and in other embodiments may be and adjustable type under the control of controller 130. It should be understood that the above examples are not intended to be limiting and any number of shared lens configurations may be used.

In addition, a controller 130 may determine an overall illumination intensity (not shown), may determine illumination field 140 and may determine illumination pattern 150 for the illumination array 110. In some embodiments, the controller 130 may be implemented in hardware or in software. In some embodiments, controller 130 may be implemented by one or more processors via program instructions stored in a memory of a mobile device. In some embodiments, the controller 130 may instruct an illumination element array to illuminate a scene using variable illumination intensities for a particular illumination field and illumination pattern by controlling the individual intensities of respective illumination elements within the illumination array 110. In some embodiments, the controller 130 may additionally instruct an adjustable projection lens to be actuated via an actuator, such as the projection lens 120, as part of implementing a particular illumination field 140 and illumination pattern 150.

Various illumination patterns 150 may be implemented by the controller 130. In some embodiments, the controller may implement wide illumination patterns to evenly illuminate scenes with a wide field of view. In some embodiments, a wide pattern may be achieved by controlling individual elements of the illumination array 110 to all emit a relatively same amount of light while in other embodiments an adjustable projection lens 120 may be configured to project a wide illumination field 140 by adjusting a position of the projection lens 120 relative to the illumination array 110. In still other embodiments a combination of control of illumination elements and a projection lens may be employed. In some embodiments, a narrow pattern may be achieved by controlling elements contributing to the center of the illumination field to emit more light than elements contributing to the periphery of the illumination field, while in other embodiments an adjustable projection lens 120 may be configured to be adjusted via an actuator to project a narrow illumination field 140. In still other embodiments a combination of control of illumination elements and adjustment of a projection lens may be employed. In some embodiments, more complex illumination patterns 150 may be employed, as discussed below in FIGS. 4-24.

In some embodiments, an overall amount of power consumed by an illumination array may be constrained for various reasons including battery life and heat dissipation. By varying the illumination produced by individual elements of the illumination array, greater illumination of objects of interest for a given amount of power may be realized, or in the alternative proper illumination of objects of interest may be provided at a reduced overall level of power consumed.

Figure 2:
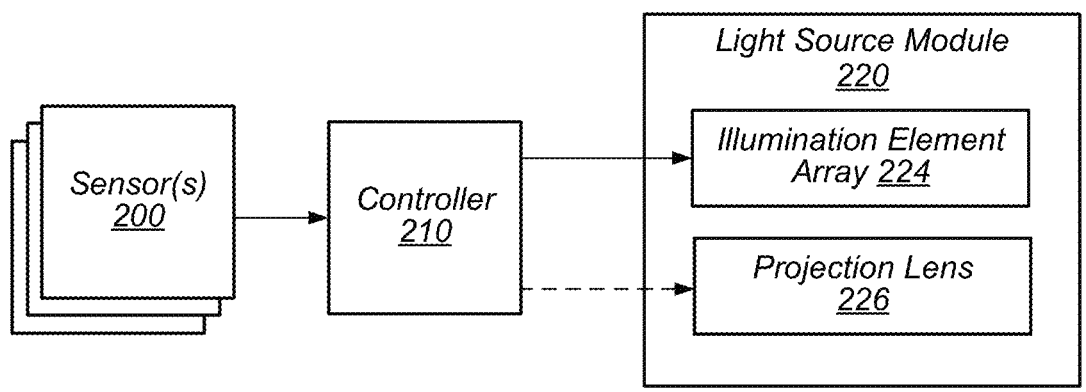
FIG. 2 illustrates a system including a controller that can adjust an illumination array and projection lens, according to some embodiments.

FIG. 2 illustrates a system including a controller that is configured to adjust an illumination array and projection lens, according to some embodiments. One or more sensors, such as sensor(s) 200, may detect a condition of a scene to be illuminated by a light source module. Examples of such sensors are camera imaging sensors, depth sensors, focus sensors, and ambient light sensors, in various embodiments. These examples, however, are merely examples and any number of sensors detecting various lighting conditions of a scene may be employed and the above examples are not intended to be limiting.

The sensor(s) communicates with a controller, such as controller 210, and the controller determines an illumination intensity, illumination field and illumination pattern for an illumination array based on measurements of the scene determined via the sensors. In some embodiments, a controller, such as controller 210, may be implemented in hardware or in software. In some embodiments, controller 210 may be implemented via program instructions executed on one or more processors of a mobile device, wherein the program instructions are stored in a memory of the mobile device.

A light source module, such as light source module 220, may comprise an illumination element array 224, such as the illumination array 110 of FIG. 1, and projection lens 226, such as the projection lens 120 of FIG. 1. In some embodiments, a controller, such as controller 210 may instruct an illumination element array to illuminate at a particular overall illumination intensity with a particular illumination field and illumination pattern by controlling the individual intensities of respective illumination elements within the illumination array 224. In some embodiments, the projection lens, such as the projection lens 226, may be a fixed lens, while in other embodiments the controller 210 may additionally instruct an actuator to adjust a position of an adjustable projection lens as part of implementing a particular illumination field and illumination pattern.

Example Mobile Devices Including an Adjustable Light Source Module

Figure 3A:
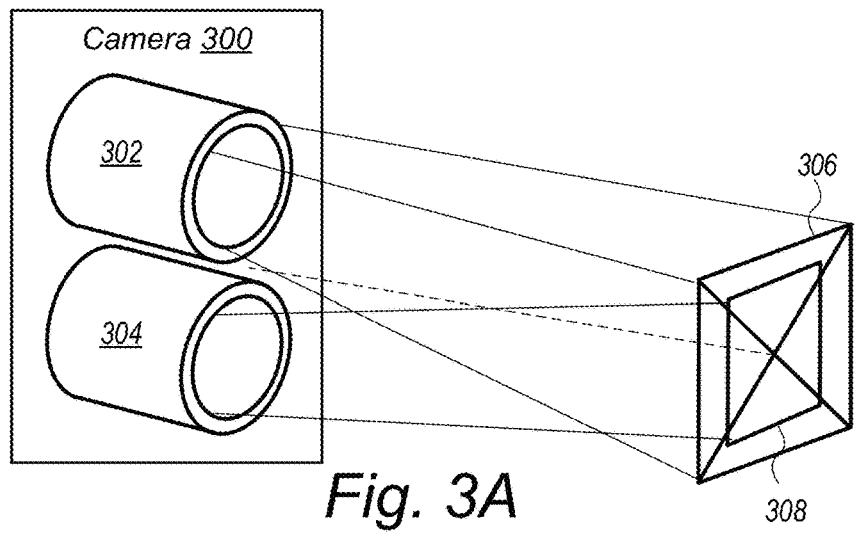
FIG. 3A illustrates a composite camera field of view, according to some embodiments.

FIG. 3A illustrates an example composite field of view that includes a combination of a telephoto field of view and a wide-angle field of view, according to some embodiments. Camera 302 may include a wide-angle camera and lens system 302 and a telephoto camera and lens system 304. Individual camera and lens systems, such as 302 and 304, may have one or more characteristic fields of view that are defined by respective focal lengths of the system lenses and the two-dimensional size of a camera sensor within the respective camera and lens systems. While not shown, in some embodiments, additional lens systems may be used such as an ultra-wide lens system.

In some embodiments, camera systems 302 and 304 may be arranged such that the fields of view of the cameras overlap one another. For example, wide angle field of view 306 from camera 302 may overlap with telephoto field of view 308 from camera system 304. Also, in some embodiments, camera systems 302 and 304 may be arranged such that at least a portion of one of the fields of view of the respective cameras does not overlap with the other camera fields of view. For example, at least a portion of wide-angle field of view 306 from camera system 302 does not overlap with telephoto field of view 308 from camera system 304. In some embodiments, a composite field of view may include both the wide-angle field of view and the telephoto field of view. In some embodiments, a camera arrangement may include other lens systems or additional lens systems. For example, in some embodiments, one or more intermediate lens systems between a full telephoto lens system and a full wide-angle lens system may be included. Also, in some embodiments, an ultra-wide lens system may be included. In regard to a particular image capture operation or ongoing image capture operation, a controller for a mobile device that includes camera 300 may select a level of inclusion for image data from the wide-angle field of view 306 and the telephoto field of view 308 in an image (or video) to be captured by camera 300. As described above, a light source controller may determine an illumination intensity with a particular illumination field and illumination pattern based on the level of inclusion of the telephoto field of view or the wide-angle field of view in the composite field of view of the camera 300.

Figure 3B:
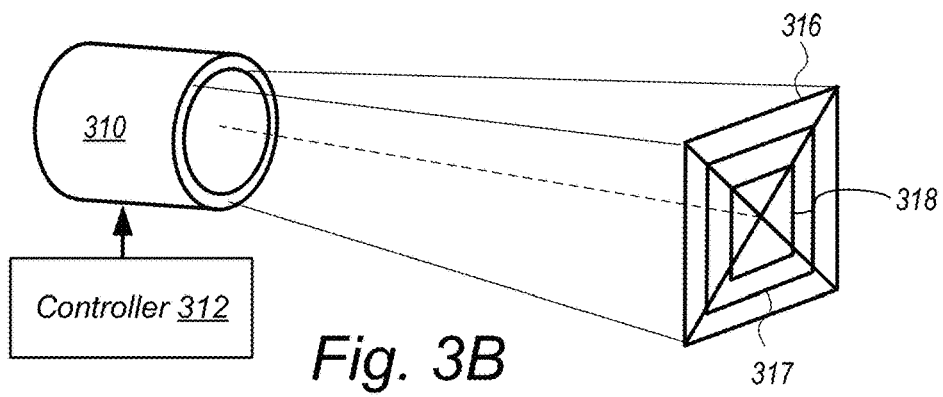
FIG. 3B illustrates a camera with a single lens component providing variable fields of view, according to some embodiments.

FIG. 3B illustrates an example single lens camera that may provide variable fields of view, according to some embodiments. Camera 310 may include a single lens system, that, in various embodiments, may have one or more characteristic fields of view that are defined by respective focal lengths of the lens and the two-dimensional size of a camera sensor (not shown) within the respective camera 310. In some embodiments, the one or more characteristic fields of view may include a wide or ultrawide field of view characteristic of wide or ultrawide angle lenses, while in other embodiments the one or more characteristic fields of view may include narrower fields of view such as associated with portrait or telephoto lens systems. In various embodiments, an active two-dimensional area of the camera sensor may be configured to adjust the field of view, where a widest field of view of the camera 310 may be obtained by enabling a maximum or entire area of the camera sensor and progressively narrower fields of view may be configured by reducing the active area of the sensor by deactivating or discarding data from sensor elements along the periphery of the sensor. Furthermore, each of the two dimensions of the sensor may be configured independently, allowing for varying aspect ratios as well as fields of view provided by the camera 310, in some embodiments. Furthermore, In some embodiments, a controller 312 for the camera sensor configuring the field of view may be implemented in software or hardware within a device hosting the camera 310, such as a mobile device 320.

Figure 3C:
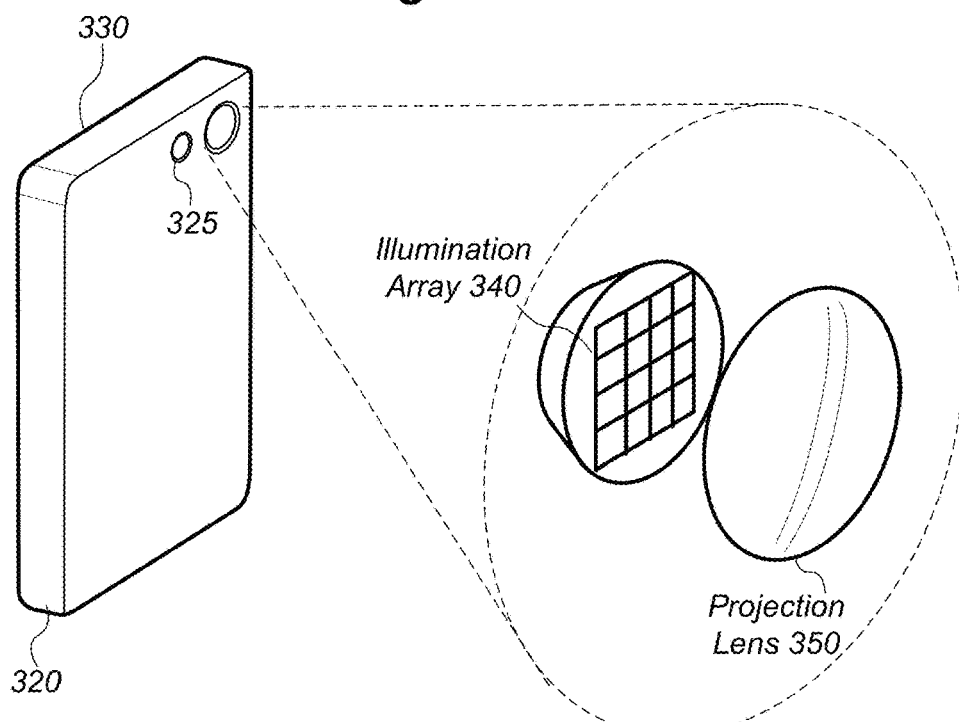
FIG. 3C illustrates a light source module with adjustable illumination array and projection lens embedded in a mobile computing device, according to some embodiments.

FIG. 3C illustrates mobile device 320 that includes light source module 330 and camera 325. Camera 325 may include a first aperture associated with a wide-angle lens system and a second aperture associated with a telephoto lens system or may include more than one camera, wherein at least one of the cameras has an aperture associated with a wide-angle lens system and at least one of the cameras has an aperture associated with a telephoto lens system. In some embodiments, additional lens systems may be included. For example, camera 320 may include wide-angle camera system 302, telephoto camera system 304, both wide-angle camera system 302 and telephoto camera system 304, or a hybrid camera that is configured to operate in both a wide-angle and telephoto mode. In some embodiments, a scene in a camera field of view may be adjusted based on a digital zoom. In some embodiments, a camera field of view may alternatively or additionally be adjusted using an optical zoom.

The light source module 330 may further include an illumination array 340, such as the illumination array 110 of FIG. 1 or the illumination element array 224 of FIG. 2, a projection lens 350, such as the projection lens 120 of FIG. 1 or projection lens 226 of FIG. 2, etc. A controller, not shown, such as the controller 210 of FIG. 2, may determine illumination intensity with a particular illumination field and illumination pattern based on camera field of view, user input, and/or data received from sensors such as sensors 200 of FIG. 2. Examples of such sensors may, in some embodiments, include the camera 325.

Light Source Module with Adjustable Field of Illumination

Figure 4A:
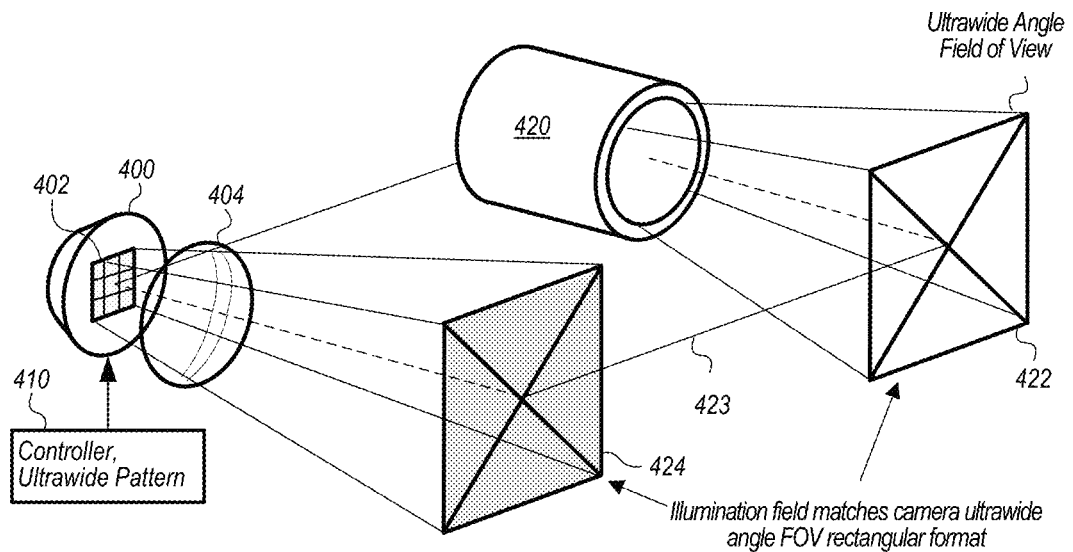
FIGS. 4A-C illustrate a light source module with adjustable illumination array and projection lens illuminating scenes at different distances, according to some embodiments.
Figure 4B:
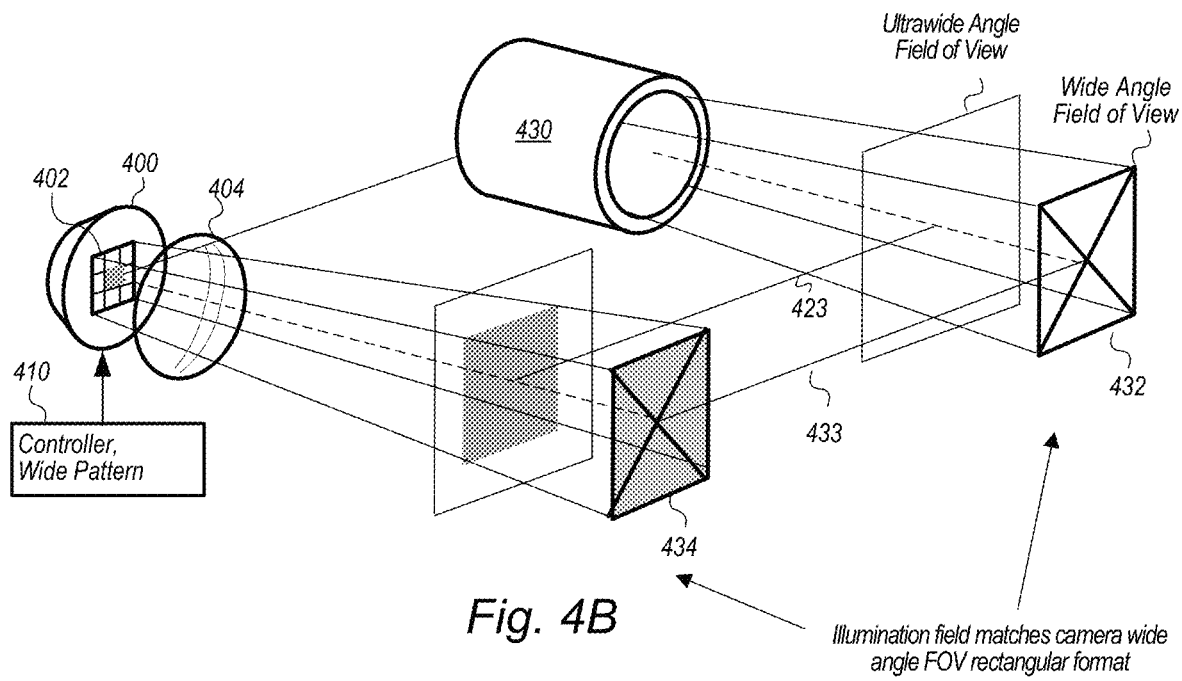
Figure 4C:
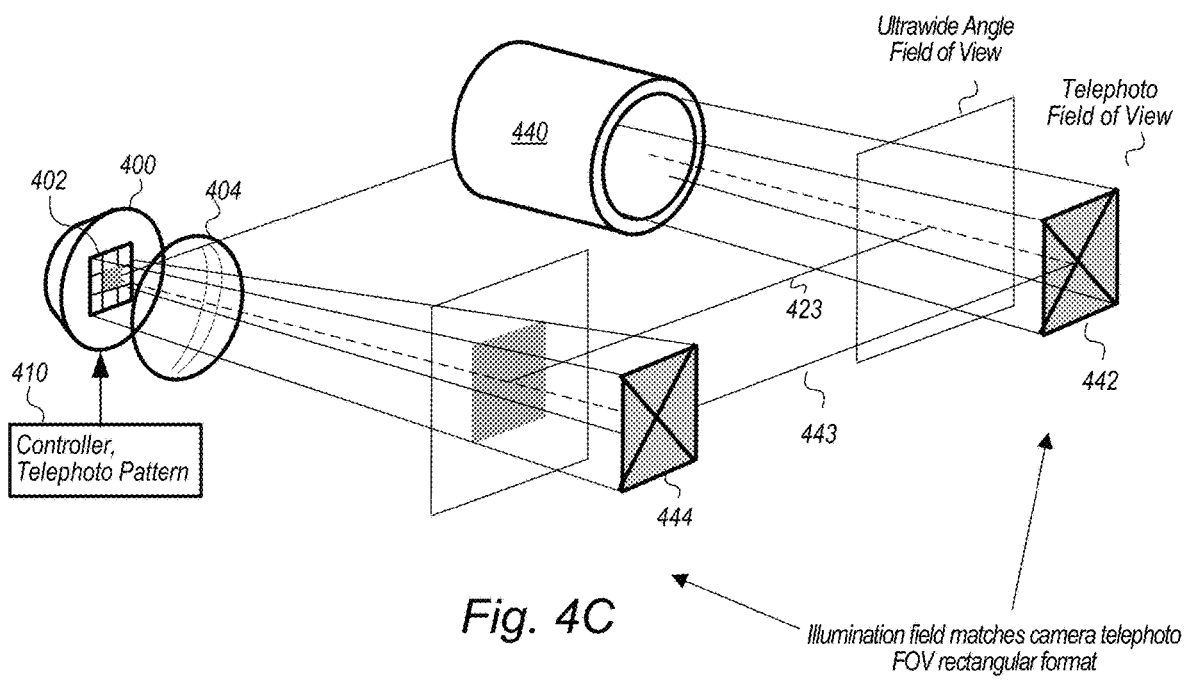

In some embodiments, a light source module may include an adjustable illumination array and projection lens illuminating scenes at different distances. In some embodiments, a controller, such as controller 410 as shown in FIG. 4A-4C, may use a level of inclusion of a wide-angle field of view of a wide-angle lens system and a level of inclusion of a telephoto field of view of a telephoto lens system in a composite camera, such as is shown above in FIG. 3A, for a field of view to determine a level of diffusion for illuminating a scene in the composite camera field of view. For ease of illustration, a composite using two lens systems is described. However, in some embodiments, a composite camera may include additional lens systems, such as three or more lens systems, in some embodiments.

In some embodiments, a level of inclusion of a wide-angle field of view or a level of inclusion of a telephoto field of view may be inferred from camera zoom level information and/or distance information. In some embodiments, a camera may determine an estimated distance to an object in a camera field of view and a controller for a light source module may use the estimated distance determined by the camera to adjust a level of diffusion for illumination of a scene. In some embodiments, a controller may receive camera information from a camera, such as auto-focus information, and may determine an estimated distance to an object in a scene in a camera field of view based on the received camera information. In some embodiments, a controller may determine an estimated distance to a scene to be captured by a camera based on whether the camera is operating in a telephoto mode or a wide-angle mode. Also, in some embodiments, a mobile device may include multiple cameras, such that when operating in a telephoto mode a telephoto camera is selected and when operating in a wide-angle mode, a wide-angle camera is selected. In some embodiments a single camera may include two or more apertures and two or more lens systems, wherein one of the lens systems has a wider angle than the other lens system(s), such as a telephoto lens system. Also, in some embodiments, a mobile device may operate in a hybrid mode that utilizes both a telephoto camera and a wide-angle camera at the same time. A controller may use any of the above-described combinations of wide angle, telephoto, and/or varying degrees of wide-angle/telephoto composite field of view selections to adjust an illumination array and projection lens system. Additionally, a controller may measure distance directly, for example via a LiDAR or radar sensor.

Illuminating objects in a quadrilateral scene in a camera field of view of one or more cameras associated with a light source module such that the objects are illuminated evenly in the quadrilateral scene may result in better images being captured by the associated one or more cameras than if the quadrilateral scene was illuminated such that the objects are unevenly illuminated. For example, in FIGS. 4A-4C light source module 402 has a rectangular (quadrilateral) output pattern 424 and 434. A rectangular output pattern of a light source module may be designed to match a rectangular (quadrilateral) scene in a camera field of view of an associated one or more cameras. Thus, the light source module may be configured to project light in a pyramid shaped pattern matching the one or more camera's field of view with rectangular cross-sections at various distances from the one or more cameras. However, at varying width camera fields of view different levels illumination may be required from individual elements if the illumination array to evenly illuminate objects in a camera field of view while maintaining a rectangular illumination pattern of a scene at a given distance within the camera field of view.

As shown in FIG. 4A, camera 420 is primarily in an ultrawide-angle camera selection and controller 410 may adjust light source illumination module 400 output to an ultrawide pattern output level based on the level of inclusion of the ultrawide-angle field of view and/or an estimated distance 423 to scene 422 in a composite field of view. This ultrawide pattern may be achieved by controlling individual elements 402 to all emit a relatively same amount of light as discussed above in FIG. 1. Adjusting controller 410 to the ultrawide pattern output level causes light emitted from illumination elements 402 to evenly illuminate scene 424 in an illumination field of the light source module, wherein scene 424 has a quadrilateral shape matching scene 422 in the composite field of view. For clarity, scene 422 in the composite field of view and scene 424 in the illumination field are shown in FIG. 4A as adjacent to each other. However, in operation, scene 424 in the illumination field and scene 422 in the composite field of view may be on top of each other, e.g., camera 420 may be taking a picture of the same scene that is being illuminated by light source module 400.

As shown in FIG. 4B, camera 430 is primarily in a wide camera selection and controller 410 may adjust light source illumination module 400 output to a wide pattern output level providing a more focused pattern to reach scene 434 in the illumination field that is at a further distance 433. This wide pattern may be achieved by controlling individual elements 402 such that elements contributing to the center of the illumination field emit more light that elements contributing to the periphery of the illumination field, as discussed above in FIG. 1. Adjusting controller 410 to the wide pattern output level causes light emitted from illumination elements 402 to evenly illuminate scene 434 in an illumination field of the light source module, wherein scene 434 has a quadrilateral shape matching scene 432 in the composite field of view. As discussed above, scene 434 in the illumination field and scene 432 in the composite field of view are illustrated as being adjacent to one another in FIG. 4B. However, in operation scene 434 and scene 432 may be on top of each other or represent the same scene.

As shown in FIG. 4C, camera 440 is primarily in a telephoto camera selection and controller 410 may adjust light source illumination module 400 output to a narrow or telephoto pattern output level providing a more focused pattern to reach scene 444 in the illumination field that is at a further distance 443. This narrow pattern may be achieved by controlling individual elements 402 such that elements contributing to the center of the illumination field emit more light that elements contributing to the periphery of the illumination field, as discussed above in FIG. 1. Adjusting controller 410 to the telephoto or narrow pattern output level may cause light emitted from illumination elements 402 to evenly illuminate scene 444 in an illumination field of the light source module, wherein scene 444 has a quadrilateral shape matching scene 442 in the composite field of view. As discussed above, scene 444 in the illumination field and scene 442 in the composite field of view are illustrated as being adjacent to one another in FIG. 4C. However, in operation scene 444 and scene 442 may be on top of each other or represent the same scene.

Figure 5:
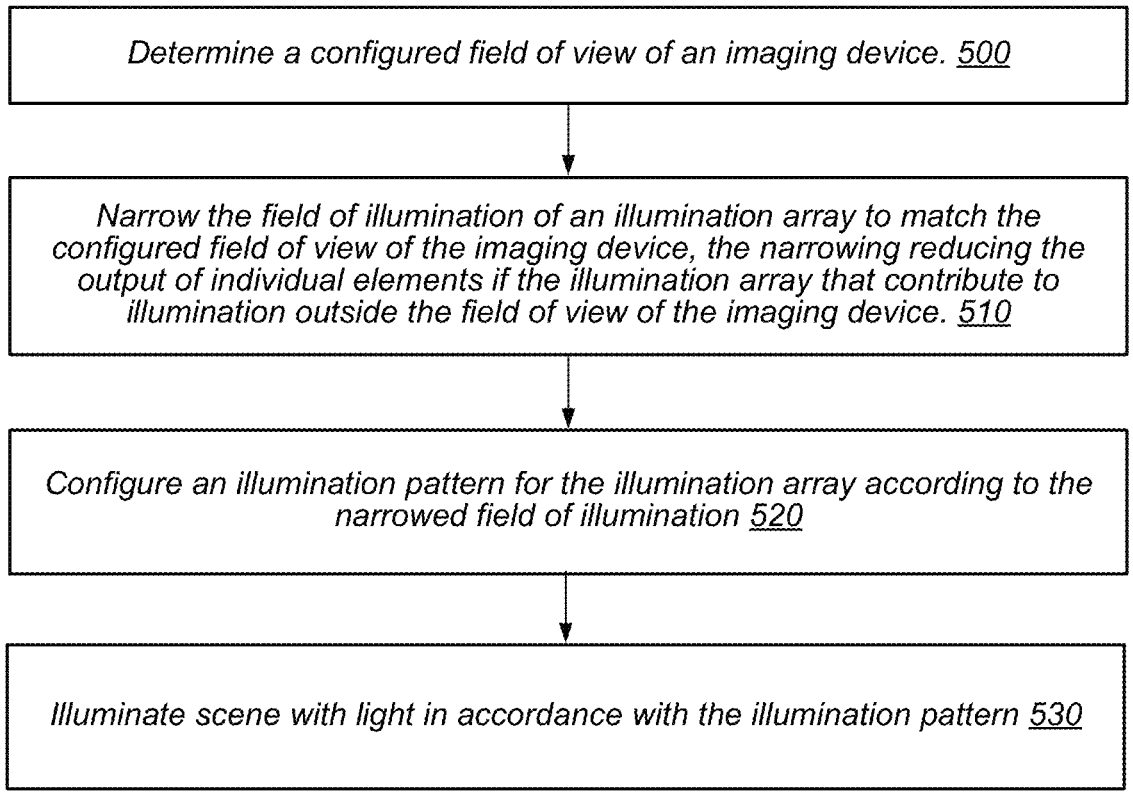
FIG. 5 is a flow diagram illustrating a method for providing field of view compensation using an illumination array and projection lens, according to some embodiments.

FIG. 5 is a flow diagram illustrating a method for providing field of view compensation using an illumination array and projection lens, according to some embodiments. The method begins at step 500 where, during the capture of an image, a configured field of view for an imaging device may be determined. This determination may be performed in a number of ways, as discussed above in FIGS. 3 and 4.

Once the configured field of view for the imaging device has been determined, the method may proceed to step 510 where a controller, such as the controller 130 of FIG. 1, may determine a field of illumination that is narrowed to match the determined field of view for the imaging device, in some embodiments. To accomplish this, the controller may diminish, or disable, individual elements of an illumination array that contribute to a periphery of an illumination field outside the determined field of view for the imaging device to narrow the field of illumination to match the determined field of view for the imaging device, in some embodiments.

Once the field of illumination has been established, the method proceeds to step 520 where individual elements of an illumination array, such as the illumination array 110, may be configured to provide an illumination pattern, such as the illumination pattern 150 of FIG. 1, that provides the narrowed illumination field, such as the illumination field 140 of FIG. 1, matching the determined field of view for the imaging device. In addition, elements of the illumination array contributing to illumination of the field of view of the imaging device may be scaled (e.g., by varying current supplied to the illumination elements) to provide a target illumination value for the image capture.

The method may then proceed to step 530 where a scene may be illuminated according to the determined illumination pattern, in some embodiments.

Figure 6:
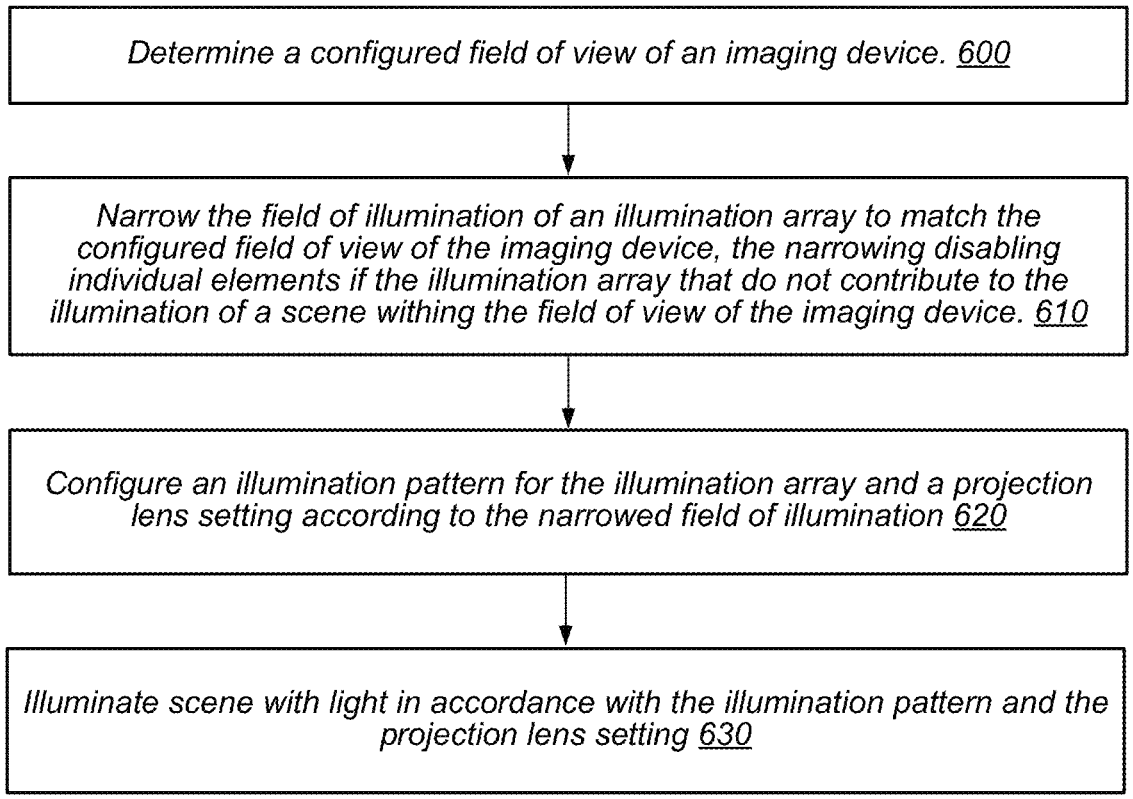
FIG. 6 is a flow diagram illustrating a method for providing field of view compensation using an illumination array and an adjustable projection lens, according to some embodiments.

FIG. 6 is a flow diagram illustrating a method for providing field of view compensation using an illumination array and an adjustable projection lens, according to some embodiments. The method begins at step 600 where, during the capture of an image, a configured field of view for an imaging device may be determined. This determination may be performed in a number of ways, as discussed above in FIGS. 3 and 4.

Once the configured field of view for the imaging device has been determined, the method may proceed to step 610 where a controller, such as the controller 130 of FIG. 1, may determine a field of illumination and illumination pattern that is narrowed to match the determined field of view for the imaging device, in some embodiments.

Once the field of illumination and illumination pattern have been established, the method proceeds to step 620 where an adjustable projection lens and individual elements of an illumination array, such as the illumination array 110, may be configured to provide the field of illumination, such as the field of illumination 140 of FIG. 1, and illumination pattern, such as the illumination pattern 150 of FIG. 1, in some embodiments. To accomplish this, the controller may adjust a position of the projection lens via an actuator to provide the determined field of illumination and may diminish, or disable, individual elements of an illumination array that contribute to a periphery of the illumination field outside the determined field of view for the imaging device to narrow the field of illumination to match the determined field of view for the imaging device, in some embodiments. In addition, elements of the illumination array contributing to illumination of the field of view of the imaging device may be scaled (e.g., by varying an amount of current supplied to the illumination elements) to provide a target illumination value for the image capture.

The method may then proceed to step 630 where a scene may be illuminated according to the determined illumination pattern, in some embodiments.

Example Method for Providing Lens Shading Compensation

Figure 7:
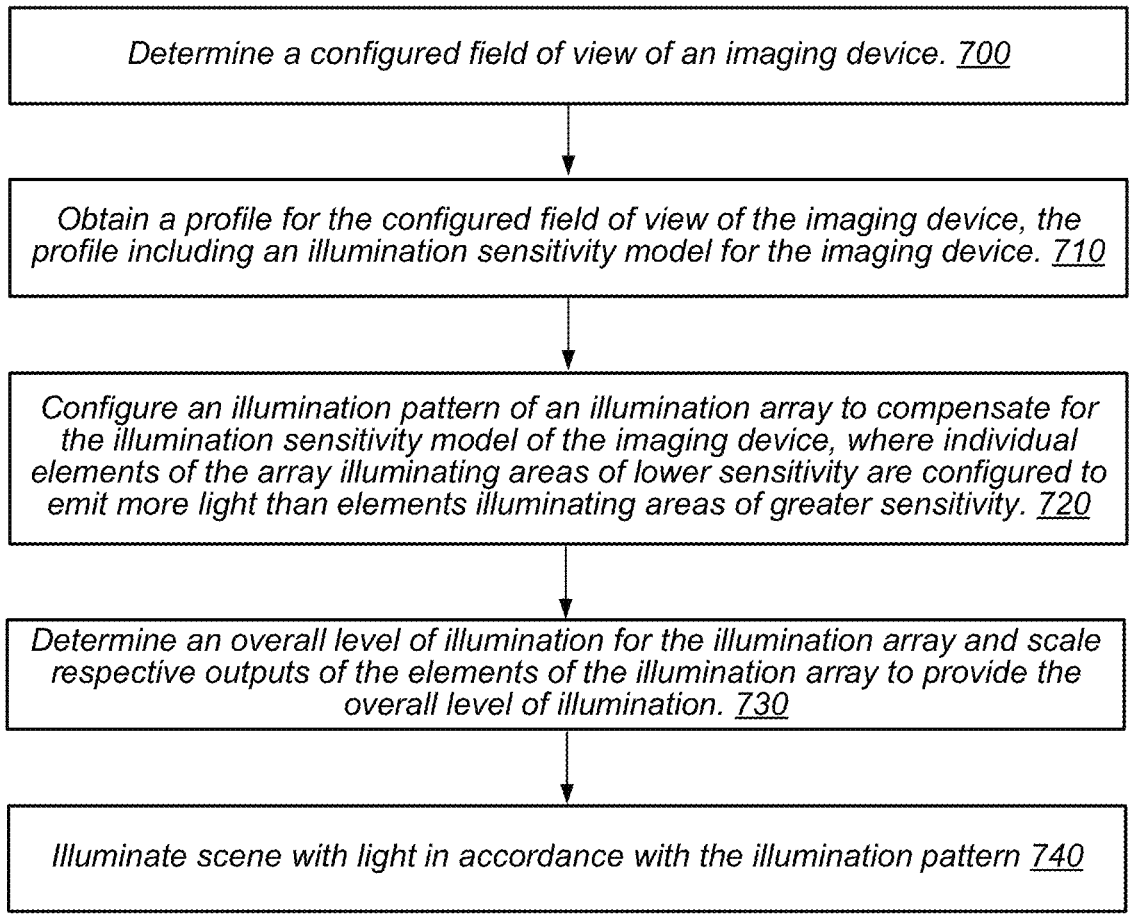
FIG. 7 is a flow diagram illustrating a method for providing imaging lens shading compensation using an illumination array and a projection lens, according to some embodiments.

FIG. 7 is a flow diagram illustrating a method for providing imaging lens shading compensation using an illumination array and a projection lens, according to some embodiments. The method begins at step 700 where, during the capture of an image, a configured field of view for an imaging device may be determined. This determination may be performed in a number of ways, as discussed above in FIGS. 3 and 4.

The imaging device may include an imaging lens that projects an image to be captured onto an imaging sensor. This imaging lens may have a characteristic focal length, where in some embodiments this focal length may be fixed while in other embodiments the focal length may be configurable. In still other embodiments, the focal length may vary over the focusing range of the lens.

The imaging sensor may have a characteristic size and, in some embodiments, a configurable active size, with the field of view of the imaging device determined by the characteristic focal length, as configured, of the imaging lens and the characteristic size or active size of the imaging sensor. In addition, illumination of the imaging sensor by the imaging lens may vary over the surface of the imaging sensor for a variety of reasons including lens shading and vignetting, resulting in variations of illumination sensitivity over the surface of the imagine sensor such as, for example, light falloff at the periphery of the image sensor giving the appearance of a darken border of the resulting image. Lens shading and vignetting, however, are merely examples of variations in illumination sensitivity; these examples are not intended to be limiting and any number of causes and effects may be imaged.

This image projected by the imaging lens onto the imaging sensor may be characterized using an illumination sensitivity model for the imaging device, the illumination sensitivity model describing variations of illumination sensitivity over the surface of the imagine sensor. Once the configured field of view for the imaging device has been determined, the method may proceed to step 710 where a profile containing this illumination sensitivity model may be obtained by a controller, such as the controller 130 of FIG. 1, in some embodiments. This profile may be obtained in a variety of ways similar to the manner in which the field of view is determined, as discussed above in FIGS. 3 and 4. In some embodiments, the illumination sensitivity model of the profile may be obtained from a lookup table associated with the field of view of the imaging device. For example, known lens shading effects may be stored in the lookup table for the particular camera configuration. This, however, is merely one example and is not intended to be limiting.

Once the illumination sensitivity model has been obtained, the method may proceed to step 720 where a controller, such as the controller 130 of FIG. 1, may configure an illumination pattern to compensate for the illumination sensitivity model of imaging device, in some embodiments. To accomplish this, the controller may adjust individual elements of an illumination array, where elements that contribute to portions of the scene with lower illumination sensitivity are configured to emit more light than elements that contribute to portions of the scene with higher illumination sensitivity, in some embodiments.

In some embodiments, a projection lens may be adjustable to control the field of illumination, such as discussed above in FIGS. 1, 2 and 6. In these embodiments, the controller may also adjust the adjustable projection lens to provide a field of illumination in combination with configuring the illumination pattern to compensate for the illumination sensitivity model of imaging device, in these embodiments.

Once the illumination pattern has been configured to compensate for the illumination sensitivity model of imaging device, the method may proceed to step 730 where an overall level of illumination for the array may be determined and elements of the illumination array contributing to illumination of the field of view of the imaging device may be scaled to provide an overall illumination value for the image capture.

The method may then proceed to step 740 where a scene may be illuminated according to the determined illumination pattern, in some embodiments. In some embodiments, such a method to compensate for lens shading and/or the illumination sensitivity model may be combined with various other ones of the methods described herein.

Example Method for Providing Backlight Compensation

Figure 8:
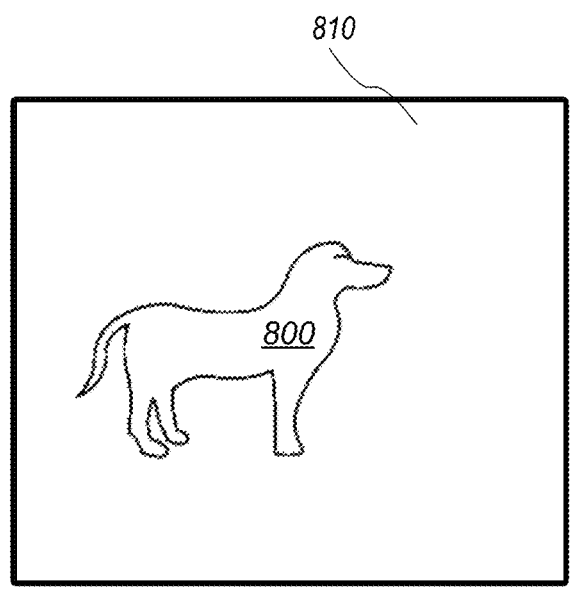
FIG. 8 illustrates an exemplary backlit scene, according to some embodiments.
Figure 9:
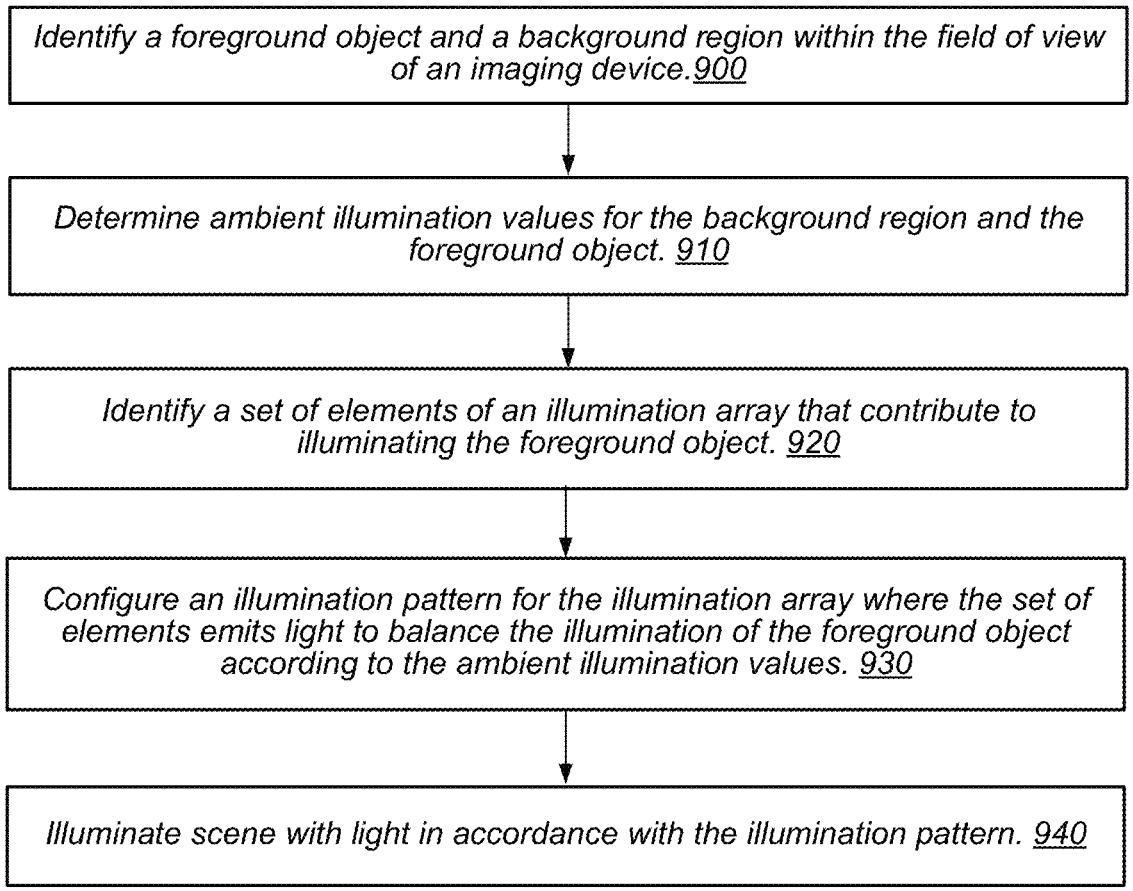
FIG. 9 is a flow diagram illustrating a method for providing backlight compensation using an illumination array and a projection lens, according to some embodiments.

FIG. 9 is a flow diagram illustrating a method for providing backlight compensation using an illumination array and a projection lens, according to some embodiments. As shown in FIG. 8, an exemplary backlit scene may include a foreground object, or subject, 800 and a background region 810.

The method begins at step 900 where, during the capture of an image, a foreground object, such as the foreground object 800 of FIG. 8, and a background region, such as the background region 810 of FIG. 8, within the field of view of an imaging device may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the foreground object and background region have been determined, the method may proceed to step 910 where ambient illumination values for the foreground object and background region may be determined. This determination may be performed in a number of ways. For example, sensors, such as sensor(s) 200 as shown in FIG. 2, may be employed to determine ambient illumination values within a scene. This example, however, is not intended to be limiting and other methods may be employed.

Once the ambient illumination values have been determined, the method may proceed to step 920 where a set of elements of an illumination array may be identified that emit light that contribute to illumination of the foreground object, in some embodiments. Once identified, as shown in step 930, a controller, such as the controller 130 of FIG. 1, may configure an illumination pattern, such as the illumination pattern 150 of FIG. 1, such that the identified set of elements emits light to balance the illumination of the foreground object according to the ambient illumination values of the foreground object and background region.

Once the illumination pattern has been configured, the method may then proceed to step 940 where a scene may be illuminated according to the determined illumination pattern, in some embodiments.

Example Method for Providing Ambience Preservation

Figure 10:
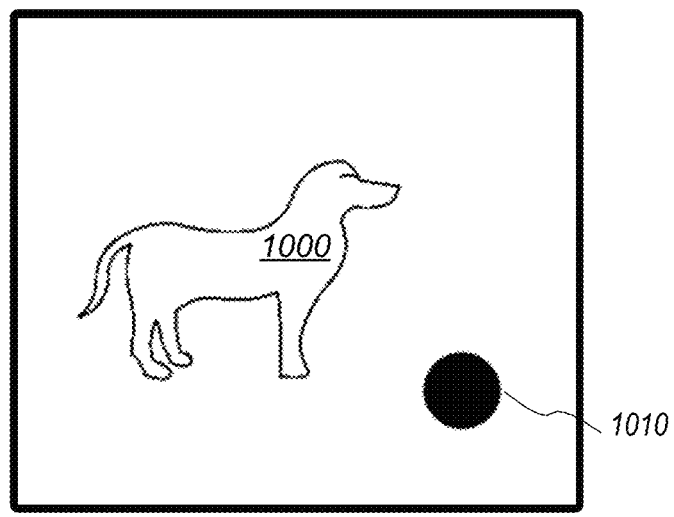
FIG. 10 illustrates an exemplary scene including background ambience, according to some embodiments.
Figure 11:
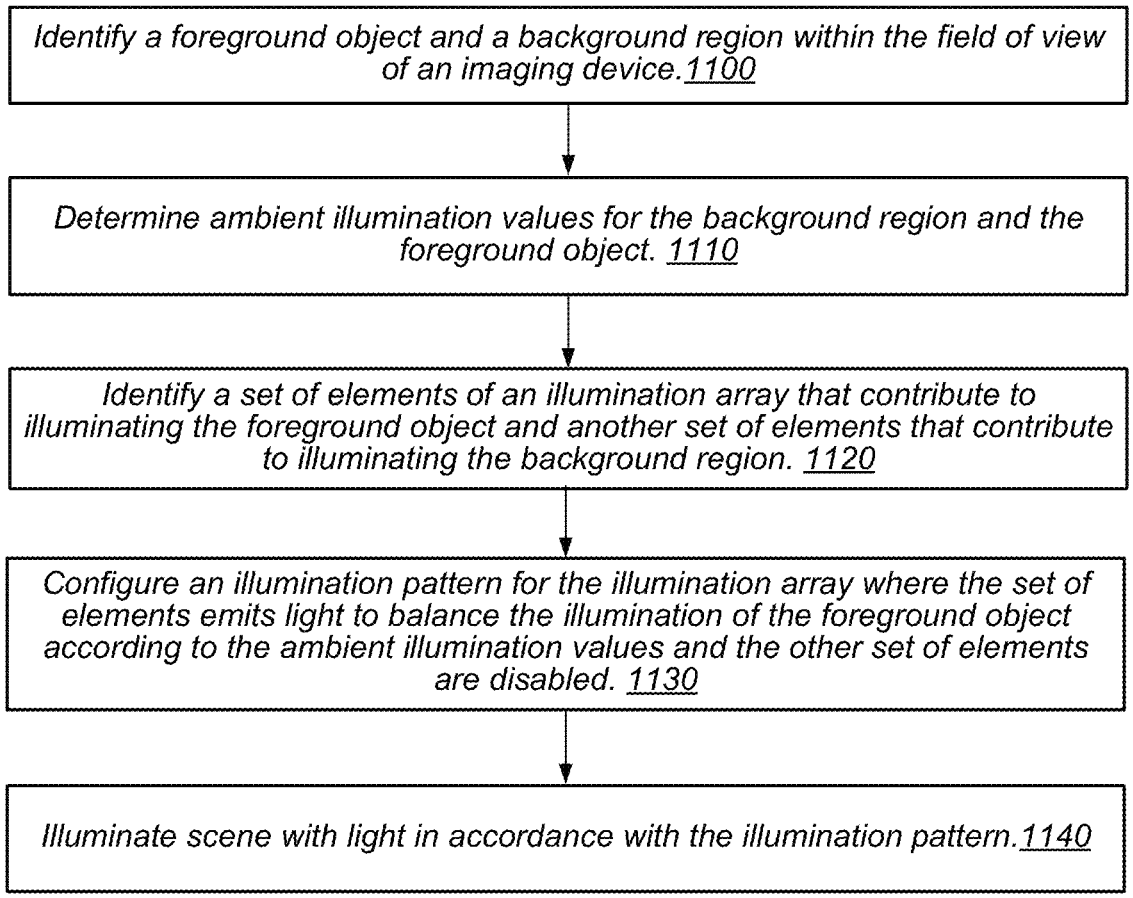
FIG. 11 is a flow diagram illustrating a method for providing ambience preservation using an illumination array and a projection lens, according to some embodiments.

FIG. 11 is a flow diagram illustrating a method for providing ambience preservation using an illumination array and a projection lens, according to some embodiments. As shown in FIG. 10, an exemplary ambience preservation scene may include a foreground object, or subject, 1000 and a background region 1010.

The method begins at step 1100 where, during the capture of an image, a foreground object, such as the foreground object 1000 of FIG. 10, and a background region, such as the background region 1010 of FIG. 10, within the field of view of an imaging device may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the foreground object and background region have been determined, the method may proceed to step 1110 where ambient illumination values for the foreground object and background region may be determined. This determination may be performed in a number of ways. For example, sensors, such as sensor(s) 200 as shown in FIG. 2, may be employed to determine ambient illumination values within a scene. This example, however, is not intended to be limiting and other methods may be employed.

Once the ambient illumination values have been determined, the method may proceed to step 1120 where a set of elements of an illumination array may be identified that emit light that contribute to illumination of the foreground object, in some embodiments. In addition, another set of elements of an illumination array may be identified that emit light that contribute to illumination of the background region, in some embodiments.

Once identified, as shown in step 1130, a controller, such as the controller 130 of FIG. 1, may configure an illumination pattern, such as the illumination pattern 150 of FIG. 1, such that the identified set of elements emits light to balance the illumination of the foreground object according to the ambient illumination values of the foreground object and background region. In addition, the identified other set of elements are disabled such that the background region is not illuminated by the other set of illumination elements, thus preserving the ambient illumination of the background region, in some embodiments.

Once the illumination pattern has been configured, the method may then proceed to step 1140 where a scene may be illuminated according to the determined illumination pattern, in some embodiments.

Example Method for Providing Minimal Disturbance Using Flash

Figure 12:
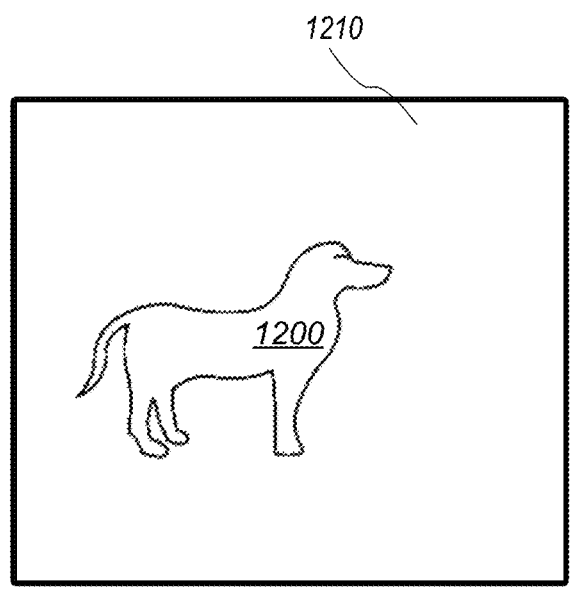
FIG. 12 illustrates an exemplary scene including an isolated subject, according to some embodiments.

FIG. 13 is a flow diagram illustrating a method for providing minimal disturbance using an illumination array and a projection lens, according to some embodiments. As shown in FIG. 12, an exemplary scene may include a foreground object, or subject, 1200 and a background region 1210.

The method begins at step 1300 where, during the capture of an image, a foreground object, such as the foreground object 1200 of FIG. 12, and a background region, such as the background region 1210 of FIG. 12, within the field of view of an imaging device may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the foreground object and background region have been determined, the method may proceed to step 1310 where a set of elements of an illumination array may be identified that emit light that contribute to illumination of the foreground object, in some embodiments.

Once identified, as shown in step 1320, a controller, such as the controller 130 of FIG. 1, may configure an illumination pattern, such as the illumination pattern 150 of FIG. 1, such that the identified set of elements emits light to illuminate the foreground object. In addition, the remaining elements of the illumination array are diminished or disabled such that disturbance of the surrounding environment due to illumination by the illumination array is minimized, in some embodiments.

Once the illumination pattern has been configured, the method may then proceed to step 1330 where a scene may be illuminated according to the determined illumination pattern, in some embodiments.

Example Method for Providing Depth Compensation

Figure 14:
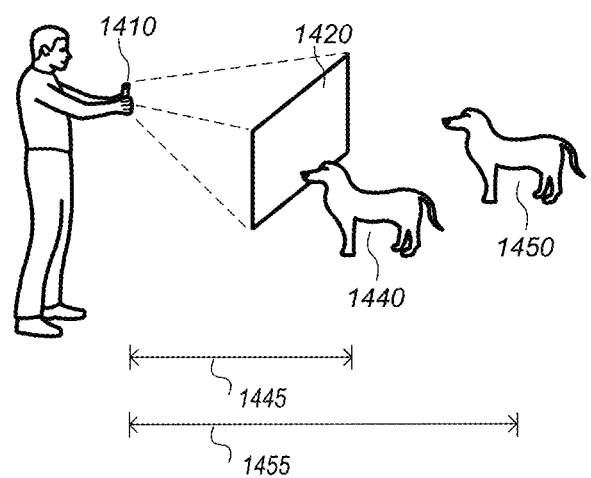
FIG. 14 illustrates an exemplary scene including objects at different depths, according to some embodiments.
Figure 15:
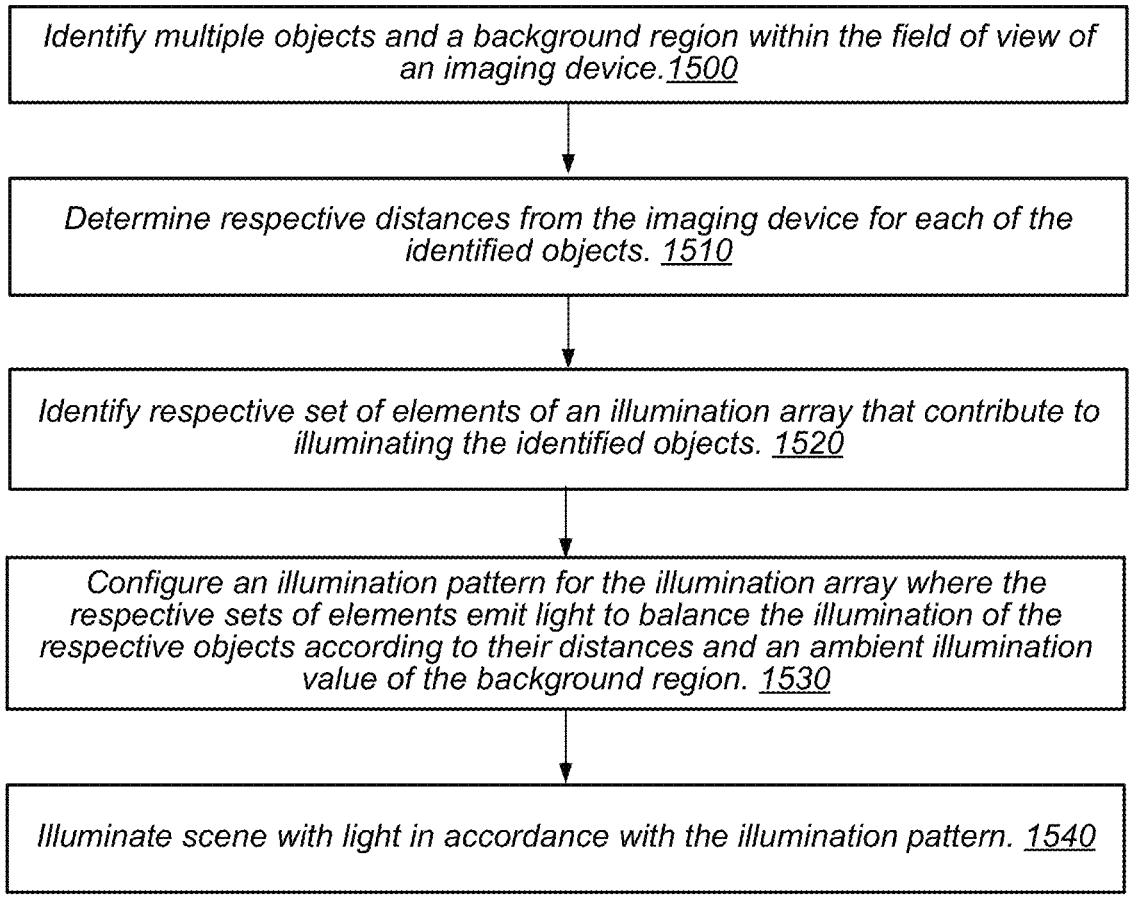
FIG. 15 is a flow diagram illustrating a method for providing depth compensation using an illumination array and a projection lens, according to some embodiments.

FIG. 15 is a flow diagram illustrating a method for providing depth compensation using an illumination array and a projection lens, according to some embodiments. As shown in FIG. 14, an exemplary scene may include objects, or subjects, 1440 and 1450 at respective distances 1445 and 1445 from an imaging device 1410 with a field of view 1420.

The method begins at step 1500 where, during the capture of an image, multiple objects, such as the objects 1440 and 1450 of FIG. 14, and a background region within the field of view, such as the field of view 1420 of FIG. 14, of an imaging device such as the imaging device 1410 of FIG. 14 may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the objects and background region have been determined, the method may proceed to step 1510 where respective distances from the imaging device, such as distances 1445 and 1445 of FIG. 14, may be determined, in some embodiments. This determination may be performed in a number of ways. For example, sensors, such as sensor(s) 200 as shown in FIG. 2, may be employed to measure object distances within a scene. This example, however, is not intended to be limiting and other methods may be employed.

Once the respective distances have been determined, the method may proceed to step 1520 where respective set of elements of an illumination array may be identified that emit light that contribute to illumination of the respective objects, in some embodiments.

Once the respective sets of elements are identified, as shown in step 1530, a controller, such as the controller 130 of FIG. 1, may configure an illumination pattern, such as the illumination pattern 150 of FIG. 1, such that the identified sets of elements emit light to illuminate the objects according to their respective distances and an ambient illumination value determined for the identified background region, in some embodiments.

Once the illumination pattern has been configured, the method may then proceed to step 1530 where a scene may be illuminated according to the determined illumination pattern, in some embodiments.

Example Method for Providing Ambience Compensation

Figure 16:
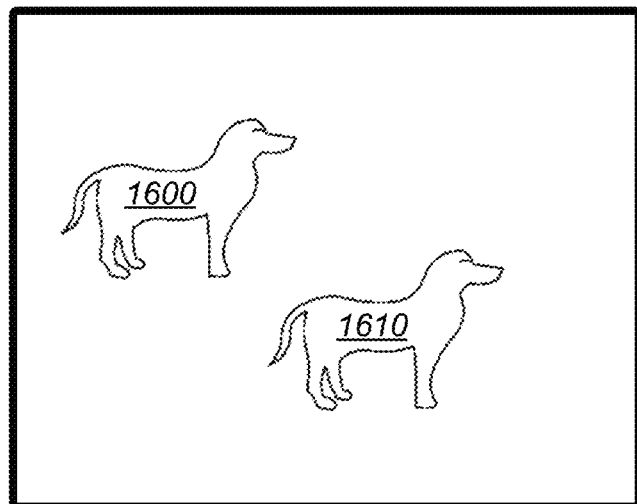
FIG. 16 illustrates an exemplary scene with objects of varying ambient illumination, according to some embodiments.
Figure 17:
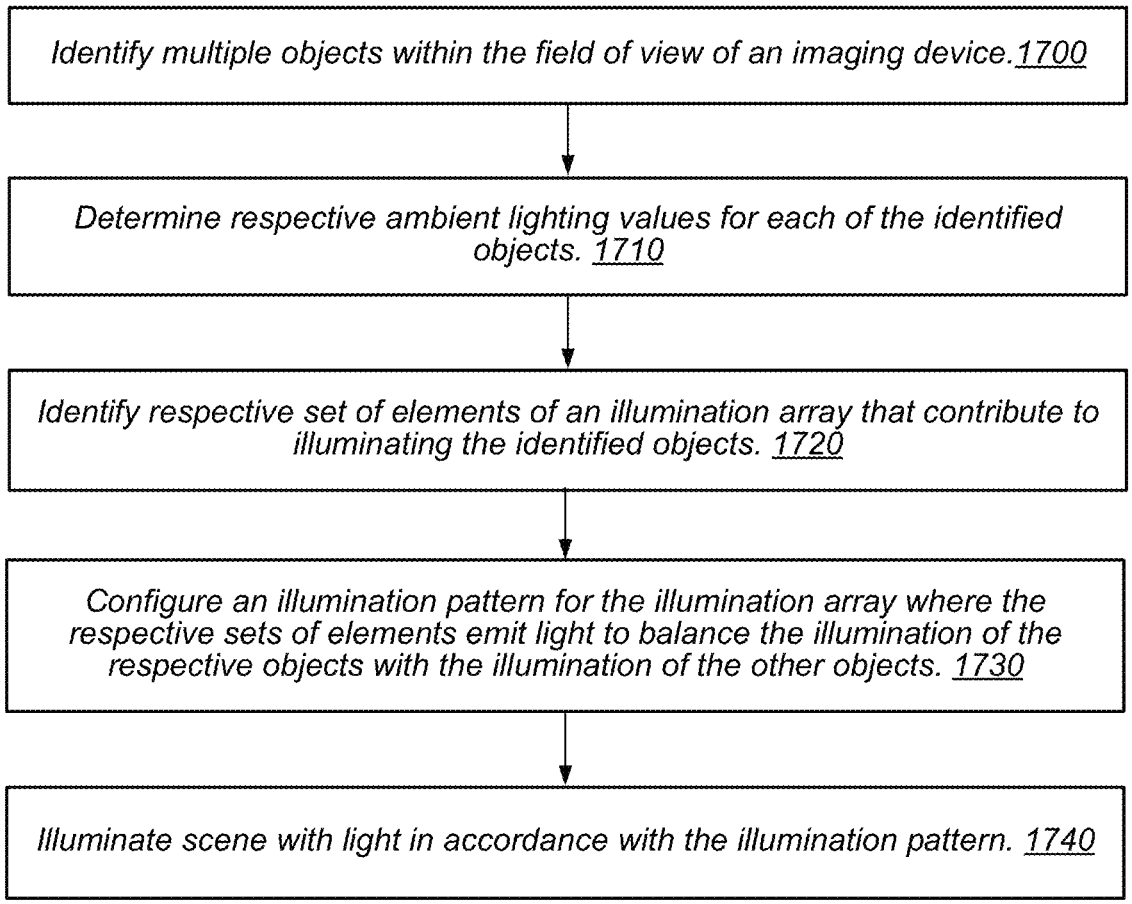
FIG. 17 is a flow diagram illustrating a method for providing ambience compensation using an illumination array and a projection lens, according to some embodiments.

FIG. 17 is a flow diagram illustrating a method for providing ambience compensation using an illumination array and a projection lens, according to some embodiments. As shown in FIG. 16, an exemplary scene may include objects, or subjects, 1600 and 1610.

The method begins at step 1700 where, during the capture of an image, multiple objects, such as the objects 1600 and 1610 of FIG. 16 within the field of view of an imaging device may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the objects have been determined, the method may proceed to step 1710 where ambient illumination values for the objects may be determined. This determination may be performed in a number of ways. For example, sensors, such as sensor(s) 200 as shown in FIG. 2, may be employed to determine ambient illumination values within a scene. This example, however, is not intended to be limiting and other methods may be employed.

Once the ambient illumination values have been determined, the method may proceed to step 1720 where respective set of elements of an illumination array may be identified that emit light that contribute to illumination of the respective objects, in some embodiments.

Once the respective sets of elements are identified, as shown in step 1730, a controller, such as the controller 130 of FIG. 1, may configure an illumination pattern, such as the illumination pattern 150 of FIG. 1, such that the identified sets of elements emit light to illuminate the objects to balance the illumination of the respective objects with the illumination of the other objects, in some embodiments.

Once the illumination pattern has been configured, the method may then proceed to step 1730 where a scene may be illuminated according to the determined illumination pattern, in some embodiments.

Example Method for Providing Reflectivity Compensation

Figure 18:
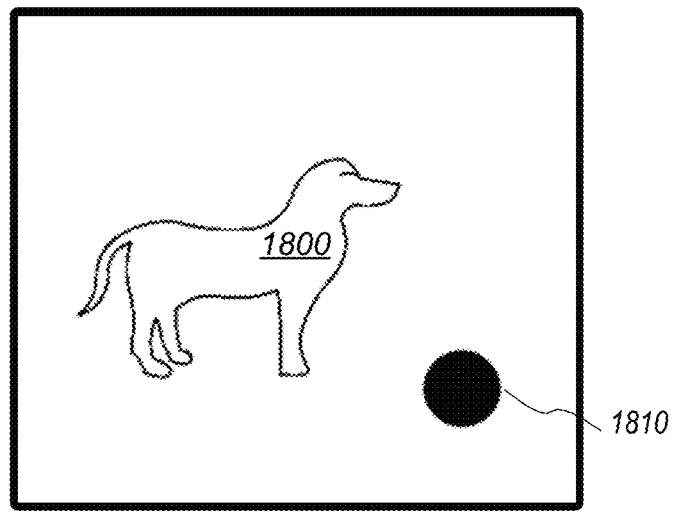
FIG. 18 illustrates an exemplary scene including objects of varying reflectivity, according to some embodiments.
Figure 19:
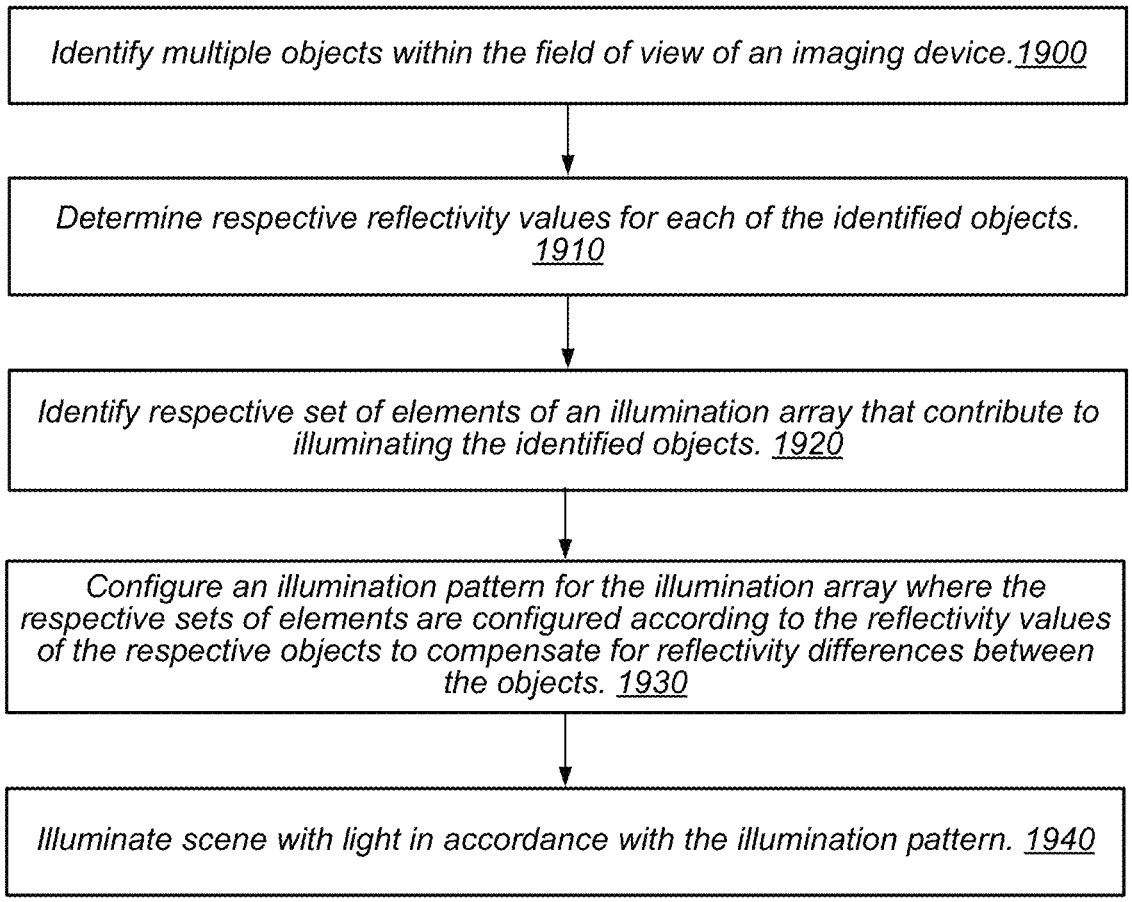
FIG. 19 is a flow diagram illustrating a method for providing reflectivity compensation using an illumination array and a projection lens, according to some embodiments.

FIG. 19 is a flow diagram illustrating a method for providing reflectivity compensation using an illumination array and a projection lens, according to some embodiments. As shown in FIG. 18, an exemplary scene may include objects, or subjects, 1800 and 1810.

The method begins at step 1900 where, during the capture of an image, multiple objects, such as the objects 1800 and 1810 of FIG. 18 within the field of view of an imaging device may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the objects have been determined, the method may proceed to step 1910 where respective reflectivity values for the objects may be determined. This determination may be performed in a number of ways. For example, sensors, such as sensor(s) 200 as shown in FIG. 2, combined with light emitted by an illumination array, such as the illumination element array 224 of FIG. 2, may be employed to determine reflectivity values within a scene. This example, however, is not intended to be limiting and other methods may be employed.

Once the respective reflectivity values have been determined, the method may proceed to step 1920 where respective set of elements of an illumination array may be identified that emit light that contribute to illumination of the respective objects, in some embodiments.

Once the respective sets of elements are identified, as shown in step 1930, a controller, such as the controller 130 of FIG. 1, may configure an illumination pattern, such as the illumination pattern 150 of FIG. 1, such that the identified sets of elements emit amounts of light to illuminate the objects to compensate for reflectivity differences between the objects, in some embodiments.

Once the illumination pattern has been configured, the method may then proceed to step 1930 where a scene may be illuminated according to the determined illumination pattern, in some embodiments.

Example Method for Providing Low Light Scene Illumination

Figure 20:
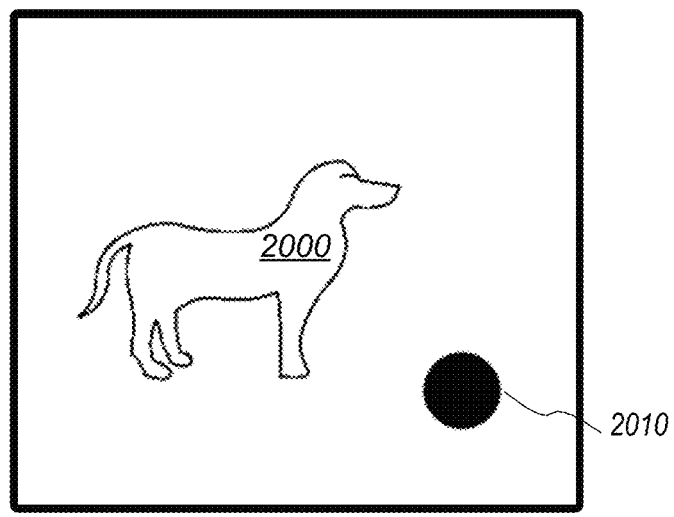
FIG. 20 illustrates an exemplary low light scene, according to some embodiments.
Figure 21:
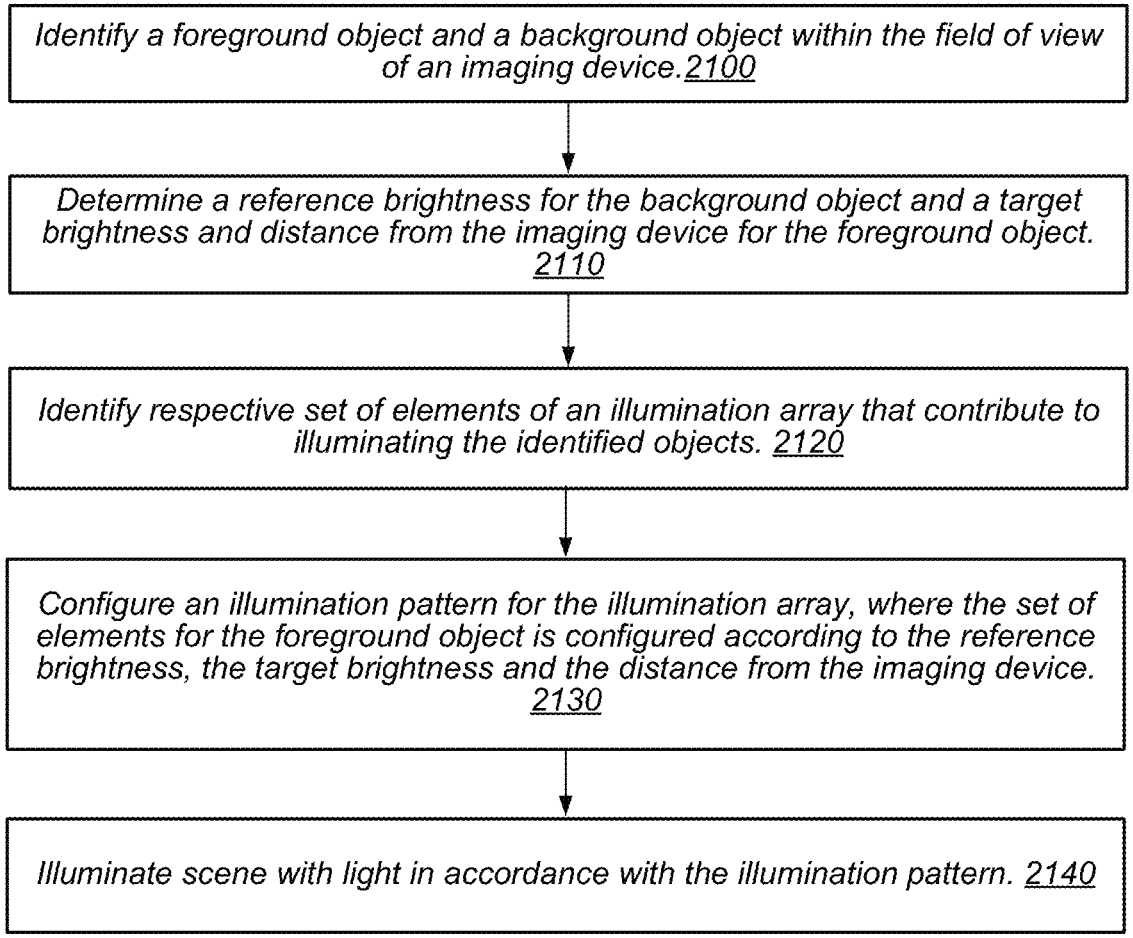
FIG. 21 is a flow diagram illustrating a method for providing low-light scene illumination using an illumination array and a projection lens, according to some embodiments.

FIG. 21 is a flow diagram illustrating a method for providing low-light scene illumination using an illumination array and a projection lens, according to some embodiments. As shown in FIG. 20, an exemplary scene may include a foreground object, or subject, 2000 and a background object 2010.

The method begins at step 2100 where, during the capture of an image, a foreground object, such as the foreground object 2000 of FIG. 20, and a background object, such as the background object 2010 of FIG. 20, within the field of view of an imaging device may be determined. This determination may be performed in a number of ways. For example, sensors, such as sensor(s) 200 as shown in FIG. 2, may be employed to locate various regions and objects within a scene. This example, however, is not intended to be limiting and various methods of determining such objects and regions may be employed.

Once the objects have been determined, the method may proceed to step 2110 where a reference brightness value for the background and object and a target brightness and distance from the imaging device for the foreground object may be determined. These determinations may be performed in a number of ways. For example, sensors, such as sensor(s) 200 as shown in FIG. 2 may be employed to determine brightness values and distances within a scene. This example, however, is not intended to be limiting and other methods may be employed.

Once the brightness and distance values have been determined, the method may proceed to step 2120 where respective set of elements of an illumination array may be identified that emit light that contribute to illumination of the respective objects, in some embodiments.

Once the respective sets of elements are identified, as shown in step 2130, a controller, such as the controller 130 of FIG. 1, may configure an illumination pattern, such as the illumination pattern 150 of FIG. 1, such that the set of elements that emits light to illuminate the foreground object is configured according to the reference brightness, the target brightness and the distance from the imaging device, in some embodiments.

Once the illumination pattern has been configured, the method may then proceed to step 2140 where a scene may be illuminated according to the determined illumination pattern, in some embodiments.

Example Method for Providing Indirect Illumination

Figure 22:
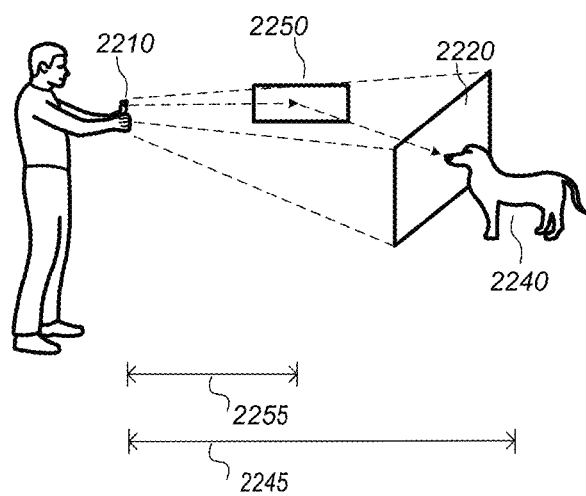
FIG. 22 illustrates an exemplary scene supporting bounce flash, according to some embodiments.

FIG. 23 is a flow diagram illustrating a method for providing indirect flash using an illumination array and a projection lens, according to some embodiments. As shown in FIG. 22, an exemplary scene may include a foreground object, or subject, 2240 at respective distance 2245 from an imaging device 2210 with a field of view 2220. In addition, the scene may include a reflective object 2250 at respective distance 2255 from an imaging device 2210.

The method begins at step 2300 where, during the capture of an image, a foreground object, such as the foreground object 2240 of FIG. 22, and a reflective object, such as the reflective object 2250 of FIG. 22, may be determined. While the foreground object may be within the field of view of the image, it should be noted that the reflective may lie within the field of view of the image or may lie outside the field of view of the image. However, in various embodiments the reflective object may lie within an illumination field of a light source module.

This determination may be performed in a number of ways. For example, sensors, such as sensor(s) 200 as shown in FIG. 2, may be employed to locate various regions and objects within a scene. This example, however, is not intended to be limiting and other methods may be employed.

Once the objects have been determined, the method may proceed to step 2310 where an orientation of the reflective object may be determined, in some embodiments, with respect to the image device, the light source module and the foreground object. This determination may be performed in a number of ways. For example, sensors, such as sensor(s) 200 as shown in FIG. 2, combined with light emitted by an illumination array, such as the illumination element array 224 of FIG. 2, may be employed to determine the orientation of the reflective object. This example, however, is not intended to be limiting and other methods may be employed.

Once the orientation has been determined, the method may proceed to step 2320 where respective set of elements of an illumination array may be identified that emit light that contribute to illumination of the foreground object, including a set of elements that emits light that directly illuminates the foreground object and a set of elements that emits light that indirectly illuminates the foreground object via reflection off of the reflective object, in some embodiments.

Once the respective sets of elements are identified, as shown in step 2330, a desired ratio of direct and indirect lighting for the foreground object may be determined. This determination may be performed in a number of ways. For example, the ratio may be determined from a selected profile, from user input through a user interface, of from a configuration default. This example, however, is not intended to be limiting and other methods may be employed.

Once the desired ratio has been determined, as shown in step 2340, a controller, such as the controller 130 of FIG. 1, may configure an illumination pattern, such as the illumination pattern 150 of FIG. 1, such that the respective sets of elements that emit light to illuminate the foreground object are configured according to the desired ratio, in some embodiments. Once configured, the set of elements that emit light directly illuminating the foreground object will be configured in proportion to the set of elements that emit light directly illuminating the foreground object, the proportion based at least in part on the determined desired ratio.

Once the illumination pattern has been configured, the method may then proceed to step 2350 where a scene may be illuminated according to the determined illumination pattern, in some embodiments.

Supplemental Illumination Matching Artistic Intent

Figure 24:
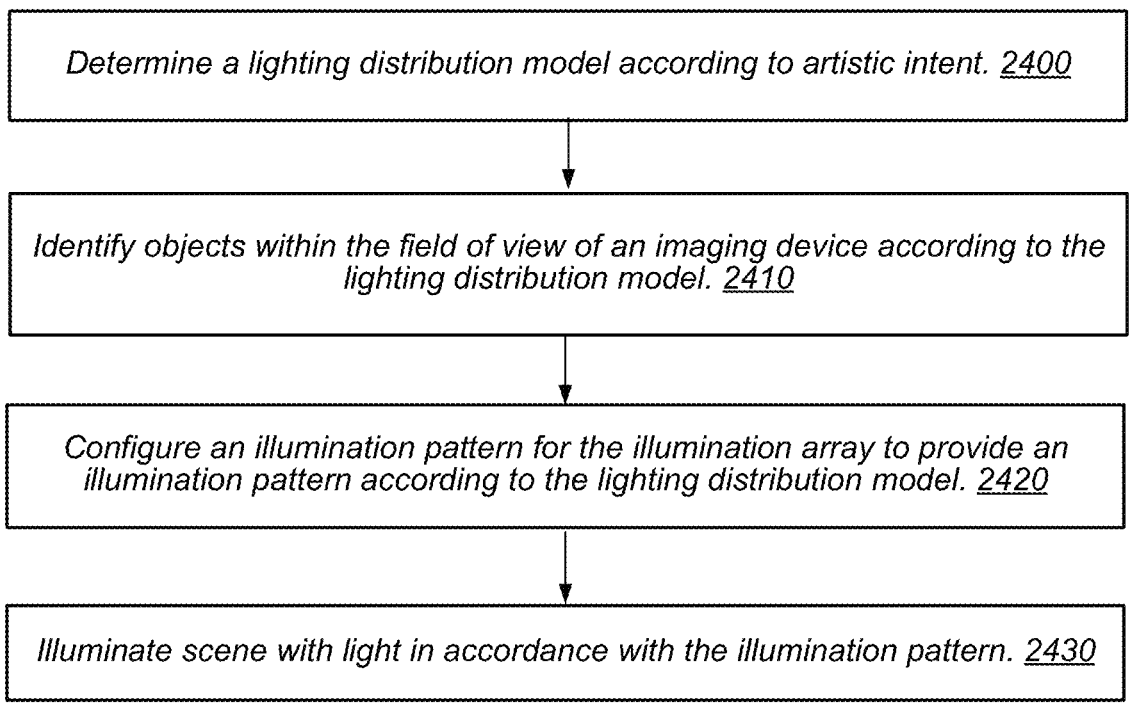
FIG. 24 is a flow diagram illustrating a method for providing creative supplemental illumination matching artistic intent using an illumination array and a projection lens, according to some embodiments.

FIG. 24 is a flow diagram illustrating a method for providing creative supplemental illumination matching artistic intent using an illumination array and a projection lens, according to some embodiments. The method begins at step 2400 where, during the capture of an image, a lighting distribution model may be determined according to artistic content. This determination may be made in a variety of ways in various embodiments. For example, in some embodiments the lighting distribution model may be selected from a number of preconfigured lighting distribution models. Examples of such preconfigured lighting distribution models may include lighting models that provide lighting patterns over the captured image to create areas of greater or lesser illumination, contrast, color etc., for example as in Vermeer lighting or Hollywood lighting techniques. Another example of a preconfigured lighting distribution model may be an illumination pattern that creates a lighting intensity or color gradient, or that serves to increase contrast or perception of depth in the image. Still other examples may include lighting patterns intended to involve emotional responses in viewers of the image. Additionally, in some preconfigured lighting distribution model, objects identified in the field of view of the image may received preconfigured different illumination, for example providing focus lighting on identified objects in the image. In some embodiments, a lighting distribution model may be determined based on previously captured images, for example to duplicate or compliment illumination found in previously selected or associated images. These various examples are not intended to be limiting, and any number of lighting distribution models may be envisioned.

The method may then proceed to 2410 where, based on the determined model, foreground objects, if identified in the determined model, may be determined. This determination may be performed in a number of ways. For example, sensors, such as sensor(s) 200 as shown in FIG. 2, may be employed to locate various regions and objects within a scene. This example, however, is not intended to be limiting and other methods may be employed.

Once the lighting distribution model and associated object are determined and identified, as shown in step 2420, a controller, such as the controller 130 of FIG. 1, may configure an illumination pattern, such as the illumination pattern 150 of FIG. 1, to provide illumination of the scene to be captured according to the artistic intent. Once the illumination pattern has been configured, the method may then proceed to step 2430 where the scene may be illuminated according to the determined illumination pattern, in some embodiments.

Example Lens and Reflectors

In some embodiments, a light source module may include a total internal reflective (TIR) lens and/or a reflector. A TIR lens may be configured to reflect light such that the light is directed in a particular direction. For example, as opposed to a non-TIR light source that generates light that leaves the light source spread across 360 degrees or 180 degrees, a TIR lens may concentrate the light into a concentrated beam in a particular direction. In some embodiments, a TIR lens may be included in a light source module between an illumination element and an adjustable light diffusing material. The adjustable light diffusing material may diffuse the concentrated light exiting the TIR lens. However, for illuminating scenes at far distances an adjustable light diffusing material may apply minimal diffusion and the concentrated beam of light from the TIR lens may travel to the farther away scene and illuminate the farther away scene to a greater degree than non-concentrated light from a light source that does not include a TIR lens. Thus, a light source module with both a TIR lens and an adjustable light diffusing material may be configured to provide diffuse light to illuminate close-up to mid-range scenes and may provide a concentrated light beam to reach far away scenes.

Figure 25A:
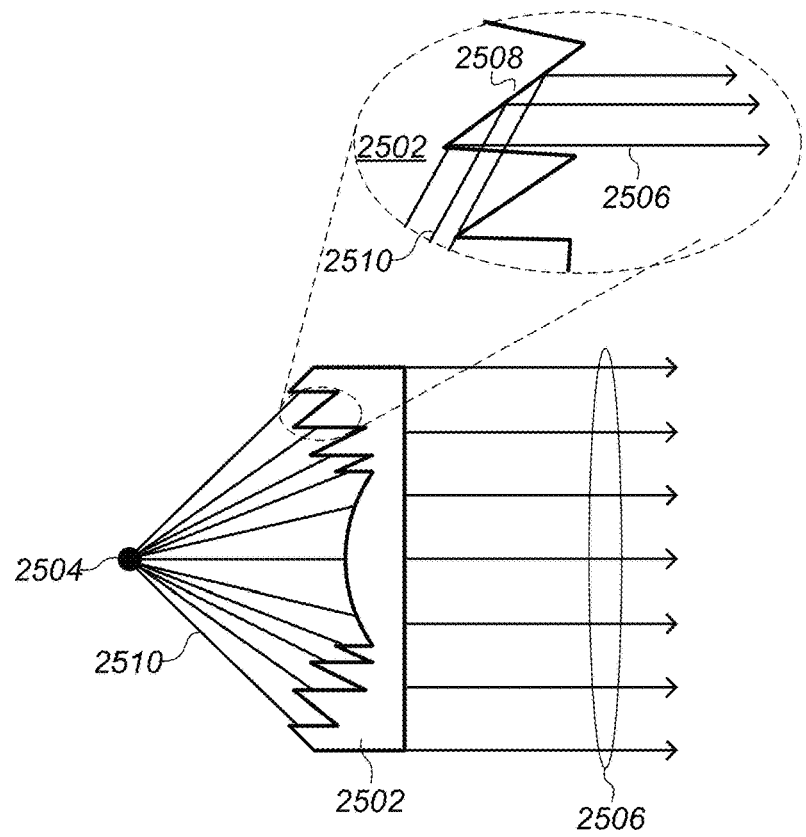
FIG. 25A illustrates a total internal reflection (TIR) lens that may be included in a light source module, according to some embodiments.

FIG. 25A illustrates an example TIR lens. Lens 2502 receives light from illumination element 2504 and provides a concentrated light beam 2506. As can be seen in the cut-out diagram, lens 2502 includes grooves 2508 that are angled such that light 2510 from illumination element 2504 pass through a portion of lens 2502 and are reflected off of grooves 2508 such that the reflected light is parallel to other light reflected off of other portions of grooves 2508. Thus, whereas light 2510 from illumination element 2504 was originally directed in multiple directions, light 2506 exiting lens 2502 is concentrated and generally directed in the same direction.

Figure 25B:
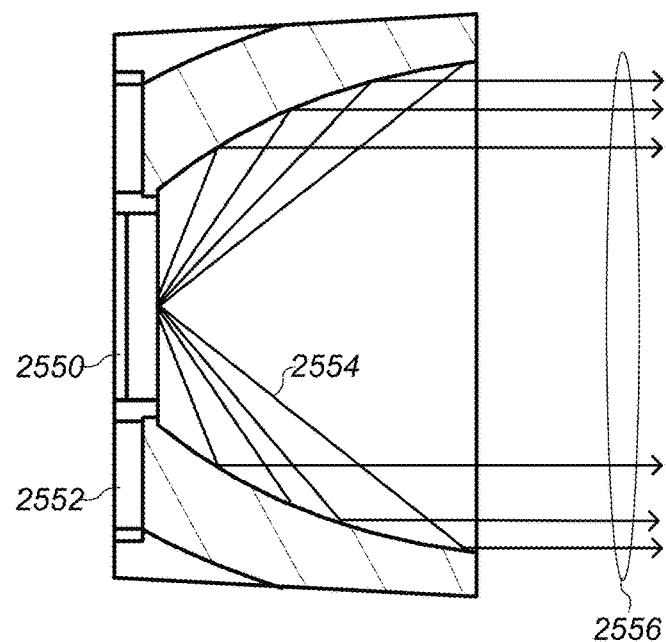
FIG. 25B illustrates a reflector that may be included in a light source module, according to some embodiments.

FIG. 25B illustrates an example reflector. The reflector includes a reflector body 2552 that has a curved shape that is designed such that light 2554 from illumination element 2550 is reflected off of the reflector body such that the reflected light is parallel to other light reflected off of the reflector body. This results in a concentrated light beam 2556 leaving reflector body 2552.

In some embodiments, a light source module may include both a TIR lens and a reflector, such as the reflector described in FIG. 25B. Furthermore, an adjustable light diffusing material may be placed in a position adjacent to a TIR lens such that light leaving the TIR lens passes through the adjustable light diffusing material before exiting the light source module.

Additional Uses of a Light Source Module

In addition to illuminating a scene to be captured by a camera or video recorder, a light source module may be used as a flashlight, as an indicator to send visual notifications to users, as an emitter to transmit information via modulated light signals, or for other uses. When being used as a flashlight, an adjustable light diffusing material may be used to adjust a beam of light emitted from a light source module. For example, a user of a mobile device with an embedded light source module may desire to have a wide beam of light when searching through an area and may desire to have a focused beam of light when working in a fixed location. A light source module, such as any of light source modules described above may be used to adjust a beam of light when used in a flashlight mode. In some embodiments, an adjustable light diffusing material may be used in a flash light mode to adjust a beam of light from a light source module between a wide beam and a concentrated or narrow beam.

Figure 26A:
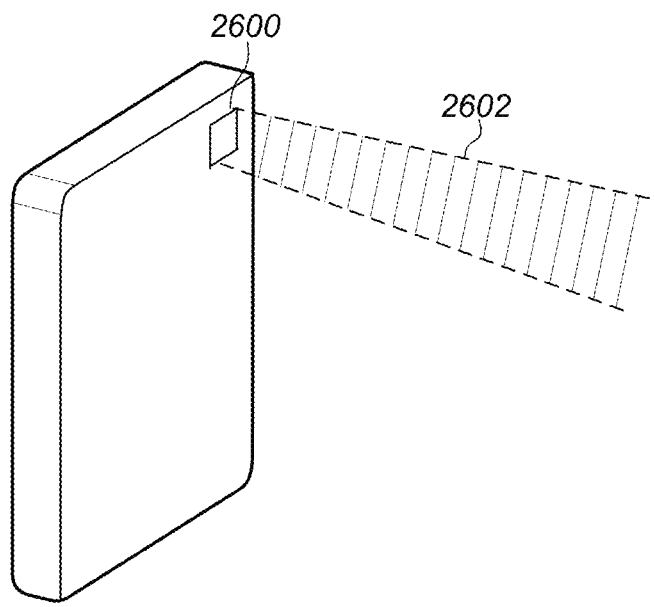
FIG. 26A-B illustrate a light source module embedded in a mobile computing device, according to some embodiments.
Figure 26B:
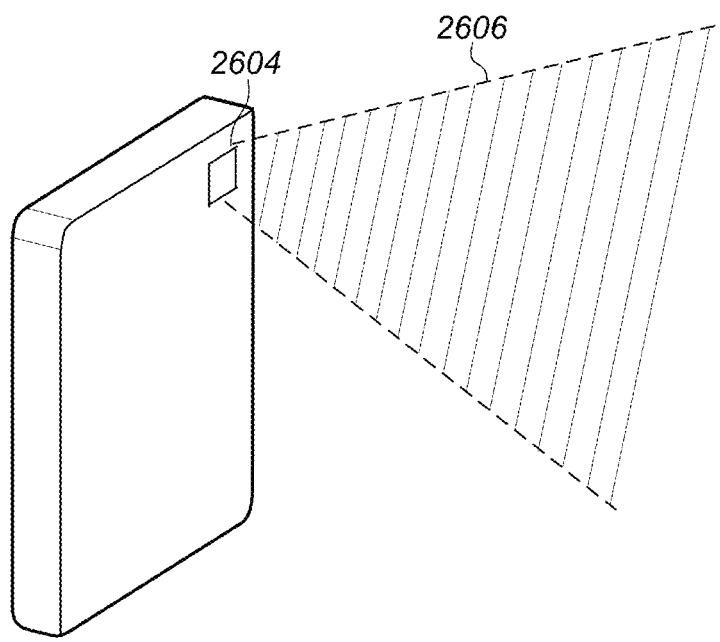

In some embodiments, a controller of a mobile device may interact with one or more other components of a mobile device to determine whether a light source module in a flash light mode should emit a wide beam of light or a concentrated or narrow beam of light. For example, a controller may interact with signals from one or more gyroscopes, accelerometers or other motion detecting devices to determine if a mobile device is scanning a wide area or is relatively still and focused on a single location. In response to determining that a mobile device is focused on a single location, a controller may switch from a wide beam mode to a narrow or concentrated light beam mode. In some embodiments, a controller may interact with a camera of a mobile device to detect objects in a scene and focus a light beam on one or more of the objects detected in the scene. For example, FIGS. 26A-B illustrates a light source module embedded in a mobile device in a flashlight mode. In FIG. 26A light source module 2600 is in a flashlight mode and in a narrow or concentrated beam mode. Light source module 2600 emits a narrow beam of light 2602. In FIG. 26B light source module 2604 is embedded in a mobile device and is in a flashlight mode and in a wide beam mode. Light source module 2604 emits a wide beam of light 2606. In some embodiments, light source modules may be embedded in a variety of devices including mobile computing devices such as phones, tablets, etc. and may be used in a flash light mode as described above.

Figure 27:
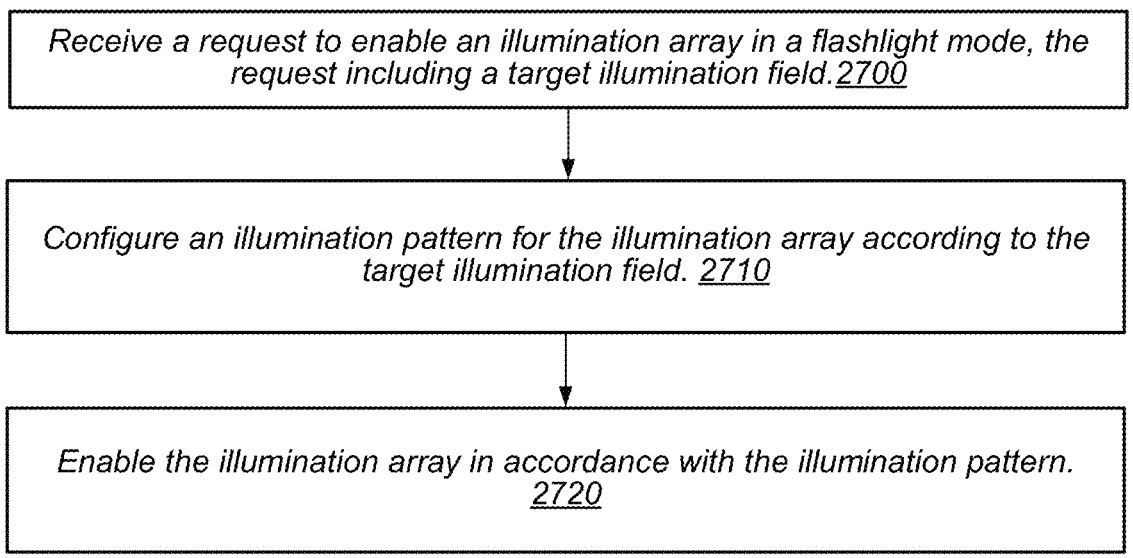
FIG. 27 is a flow diagram illustrating a method for enabling a flashlight mode using an illumination array and projection lens, according to some embodiments.

FIG. 27 is a flow diagram illustrating a method for enabling a flashlight mode using an illumination array and projection lens, according to some embodiments. The method begins at step 2700 where a controller, such as the controller 130 in FIG. 1, receives a request to enable an illumination array, such as the illumination array 110 in FIG. 1, in a flashlight mode, where the request includes a target illumination field, such as the illumination field 140 of FIG. 1, in some embodiments.

Responsive to the request, the controller, as shown in 2710, may then configure an illumination pattern, such as the illumination pattern 150 of FIG. 1, for the illumination array according to the target illumination field specified in the request, in some embodiments.

Once the illumination pattern has been configured, the method may then proceed to step 2720 where the illumination array may be enabled according to the determined illumination pattern, in some embodiments.

The following clauses describe example embodiments consistent with the drawings and the above description.

1. A mobile computing device, comprising:
a camera arrangement comprising:
an image capture device;
a plurality of illumination elements configured to emit light;
a plurality of background illumination control schemes; and
a controller for the plurality of illumination elements, wherein during capture of an image by an image capture device, the controller is configured to:
identify, within a field of view of the image capture device, a foreground object and a background region different from the foreground object;
determine an illumination pattern for the light source module based, at least in part, on:
a distance of the foreground object to the image capture device;
an ambient brightness level of the foreground object;
an ambient brightness level of the background region; and
a selected background illumination control scheme of the plurality of background illumination control schemes; and
cause individual ones of the plurality of illumination elements to respectively emit light to generate the determined illumination pattern, wherein the individual ones of the plurality of illumination elements are respectively configured to emit different amounts of light based, at least in part, on the distance of the subject to the image capture device, the ambient brightness level of the subject and the ambient brightness level of the background region.

2. The mobile computing device of clause 1, wherein:
the selected background illumination control scheme is a background preserving control scheme; and
the illumination pattern for the light source module is configured to:
maintain the brightness of the background region at the ambient brightness level of the background region; and
increase the brightness of the foreground object over the ambient brightness level of the foreground object.

3. The mobile computing device of clause 1, wherein:
the selected background illumination control scheme is a background preserving control scheme; and
the illumination pattern for the light source module is configured to:
maintain the brightness of the background region at the ambient brightness level of the background region; and
increase the brightness of the foreground object over the ambient brightness level of the foreground object.

4. The mobile computing device of clause 3, wherein:
the controller is further configured to identify respective distances of the plurality of background objects; and
the illumination pattern for the light source module is determined based, at least in part, on the respective distances of the plurality of background objects to the image capture device.

5. The mobile computing device of clause 3, wherein:
the controller is further configured to identify respective reflectivity values of the plurality of background objects; and
the illumination pattern for the light source module is determined based, at least in part, on the respective reflectivity values of the plurality of background objects.

6. The mobile computing device of clause 1, wherein:
the controller is further configured to identify respective distances of one or more additional foreground objects within the field of view of the image capture device; and
the illumination pattern for the light source module is determined based, at least in part, on the respective distances of one or more additional foreground objects.

7. The mobile computing device of clause 1, wherein:
the image capture device comprises an imaging sensor and an imaging lens configured to provide a plurality of focal lengths;
the light source module further comprises an adjustable lens configured to project the emitted light of the plurality of illumination elements; and
during the capture of the image by the image capture device, the controller is further configured to:
determine a field of illumination based, at least in part, on a configured focal length of the imaging lens and a size of the imaging sensor; and
adjust the adjustable lens to the determined field of illumination.

8. A light source module, comprising:
a plurality of illumination elements configured to emit light;
a plurality of background illumination control schemes; and
a controller for the plurality of illumination elements, wherein during capture of an image by an image capture device, the controller is configured to:
identify, within a field of view of the image capture device, a foreground object and a background region different from the foreground object;
determine an illumination pattern for the light source module based, at least in part, on:
a distance of the foreground object to the image capture device;
an ambient brightness level of the foreground object;
an ambient brightness level of the background region; and
a selected background illumination control scheme of the plurality of background illumination control schemes; and
cause individual ones of the plurality of illumination elements to respectively emit light to generate the determined illumination pattern, wherein the individual ones of the plurality of illumination elements are respectively configured to emit different amounts of light based, at least in part, on the distance of the subject to the image capture device, the ambient brightness level of the subject and the ambient brightness level of the background region.

9. The light source module of clause 8, wherein:
the selected background illumination control scheme is a background preserving control scheme; and
the illumination pattern for the light source module is configured to:
maintain the brightness of the background region at the ambient brightness level of the background region; and
increase the brightness of the foreground object over the ambient brightness level of the foreground object.

10. The light source module of clause 8, wherein:
the selected background illumination control scheme is a background compensating control scheme;
the controller is further configured to identify respective ambient brightness levels of a plurality of background objects in the background region; and
the illumination pattern for the light source module is configured to:
provide differing illumination to the foreground object and the plurality of background objects based, at least in part, on the respective ambient brightness levels of the plurality of background objects.

11. The light source module of clause 10, wherein:
the controller is further configured to identify respective distances of the plurality of background objects; and
the illumination pattern for the light source module is determined based, at least in part, on the respective distances of the plurality of background objects to the image capture device.

12. The light source module of clause 10, wherein:
the controller is further configured to identify respective reflectivity values of the plurality of background objects; and
the illumination pattern for the light source module is determined based, at least in part, on the respective reflectivity values of the plurality of background objects.

13. The light source module of clause 8, wherein:
the controller is further configured to identify respective distances of one or more additional foreground objects within the field of view of the image capture device; and
the illumination pattern for the light source module is determined based, at least in part, on the respective distances of one or more additional foreground objects.

14. The light source module of clause 8, wherein:
the image capture device comprises an imaging sensor and an imaging lens configured to provide a plurality of focal lengths;
the light source module further comprises an adjustable lens configured to project the emitted light of the plurality of illumination elements; and
during the capture of the image by the image capture device, the controller is further configured to:
determine a field of illumination based, at least in part, on a configured focal length of the imaging lens and a size of the imaging sensor; and
adjust the adjustable lens to the determined field of illumination.

15. A method comprising:
configuring a light source module during capture of an image by an image capture device, wherein the light source module comprises a plurality of illumination elements configured to emit light and a plurality of background illumination control schemes, and wherein the configuring comprises:
identifying, within a field of view of the image capture device, a foreground object and a background region different from the foreground object;
determining an illumination pattern for the light source module based, at least in part, on:
a distance of the foreground object to the image capture device;
an ambient brightness level of the foreground object;
an ambient brightness level of the background region; and
a selected background illumination control scheme of the plurality of background illumination control schemes; and
causing individual ones of the plurality of illumination elements to respectively emit light to generate the determined illumination pattern, wherein the individual ones of the plurality of illumination elements are respectively configured to emit different amounts of light based, at least in part, on the distance of the subject to the image capture device, the ambient brightness level of the subject and the ambient brightness level of the background region.

16. The method of clause 15, wherein:
the selected background illumination control scheme is a background preserving control scheme; and
the illumination pattern for the light source module maintains the brightness of the background region at the ambient brightness level of the background region and increases the brightness of the foreground object over the ambient brightness level of the foreground object.

17. The method of clause 15, wherein:
the configuring further comprises identifying respective distances of one or more additional foreground objects within the field of view of the image capture device; and
the illumination pattern for the light source module is determined based, at least in part, on the respective distances of one or more additional foreground objects.

18. The method of clause 15, wherein:
the selected background illumination control scheme is a background compensating control scheme;
the configuring further comprises identifying respective ambient brightness levels of a plurality of background objects in the background region; and
the illumination pattern for the light source module provides differing illumination to the foreground object and the plurality of background objects based, at least in part, on the respective ambient brightness levels of the plurality of background objects.

19. The method of clause 18, wherein:
the configuring further comprises identifying respective distances of the plurality of background objects; and
the illumination pattern for the light source module is determined based, at least in part, on the respective distances of the plurality of background objects to the image capture device.

20. The method of clause 18, wherein:
the configuring further comprises identifying respective reflectivity values of the plurality of background objects; and
the illumination pattern for the light source module is determined based, at least in part, on the respective reflectivity values of the plurality of background objects.

21. A mobile computing device, comprising:
a camera arrangement comprising:
an image capture device;
a plurality of illumination elements configured to emit light;
a controller for the plurality of illumination elements, wherein during capture of an image by an image capture device, the controller is configured to:
evaluate light emitted by the plurality of illumination elements, reflected by one or more objects and detected at the image capture device to determine respective reflectivity values for the one or more objects;

determine an illumination pattern for the light source module based, at least in part, on the respective reflectivity values determined for the one or more objects; and cause individual ones of the plurality of illumination elements to respectively emit light to generate the determined illumination pattern, wherein the individual ones of the plurality of illumination elements are respectively configured to emit different amounts of light based, at least in part, on the respective reflectivity values determined for the one or more objects.

22. The mobile computing device of clause 21, wherein:
the one or more objects comprise a foreground object and a bounce object;
light emitted by a first portion of the plurality of illumination elements is reflected by the bounce object to the foreground object, then reflected from the foreground object to the image capture device;
additional light emitted by a second portion of the plurality of illumination elements is reflected by the foreground object to the image capture device;
the illumination pattern for the light source module illuminates the foreground object;
the first portion of the plurality of illumination elements is configured to emit a first amount of light based, at least in part, on a reflectivity value for the bounce object; and
the second portion of the plurality of illumination elements is configured to emit a second amount of light different from the first amount of light.

23. The mobile computing device of clause 22, wherein:
the light source module further comprises an adjustable lens configured to project the emitted light of the plurality of illumination elements;
the bounce object is outside a field of view of the image capture device; and
the controller is further configured to adjust the adjustable lens to a field of illumination that includes the bounce object.

24. The mobile computing device of clause 22, wherein:
the bounce object is identified using respective depth values determined for the bounce object and the foreground object.

25. The mobile computing device of clause 22, wherein:
the first amount of light and the second amount of light are respectively determined according to a configured ratio of direct and indirect lighting.

26. The mobile computing device of clause 21, wherein:
light emitted by a first portion of the plurality of illumination elements is reflected by a first object of the one or more objects to the image capture device;
light emitted by a second portion of the plurality of illumination elements is reflected by a second object of the one or more objects to the image capture device;
the first portion of the plurality of illumination elements is configured to emit a first amount of light based, at least in part, on a determined reflectivity value for the first object;
the second portion of the plurality of illumination elements is configured to emit a second amount of light based, at least in part, on a determined reflectivity value for the second object; and
the first amount of light and the second amount of light are different.

27. The mobile computing device of clause 21, wherein:
the first amount of light is inversely proportional to the determined reflectivity value for the first object; and
the second amount of light is inversely proportional to the determined reflectivity value for the second object.

28. A light source module, comprising:
a plurality of illumination elements configured to emit light;
a controller for the plurality of illumination elements, wherein during capture of an image by an image capture device, the controller is configured to:
evaluate light emitted by the plurality of illumination elements, reflected by one or more objects and detected at the image capture device to determine respective reflectivity values for the one or more objects;
determine an illumination pattern for the light source module based, at least in part, on the respective reflectivity values determined for the one or more objects; and
cause individual ones of the plurality of illumination elements to respectively emit light to generate the determined illumination pattern, wherein the individual ones of the plurality of illumination elements are respectively configured to emit different amounts of light based, at least in part, on the respective reflectivity values determined for the one or more objects.

29. The light source module of clause 28, wherein:
the one or more objects comprise a foreground object and a bounce object;
light emitted by a first portion of the plurality of illumination elements is reflected by the bounce object to the foreground object, then reflected from the foreground object to the image capture device;
additional light emitted by a second portion of the plurality of illumination elements is reflected by the foreground object to the image capture device;
the illumination pattern for the light source module illuminates the foreground object;
the first portion of the plurality of illumination elements is configured to emit a first amount of light based, at least in part, on a reflectivity value for the bounce object; and
the second portion of the plurality of illumination elements is configured to emit a second amount of light different from the first amount of light.

30. The light source module of clause 29, wherein:
the light source module further comprises an adjustable lens configured to project the emitted light of the plurality of illumination elements;
the bounce object is outside a field of view of the image capture device; and
the controller is further configured to adjust the adjustable lens to a field of illumination that includes the bounce object.

31. The light source module of clause 29, wherein:
the bounce object is identified using respective depth values determined for the bounce object and the foreground object.

32. The light source module of clause 29, wherein:
the first amount of light and the second amount of light are respectively determined according to a configured ratio of direct and indirect lighting.

33. The light source module of clause 28, wherein:
light emitted by a first portion of the plurality of illumination elements is reflected by a first object of the one or more objects to the image capture device;
light emitted by a second portion of the plurality of illumination elements is reflected by a second object of the one or more objects to the image capture device;
the first portion of the plurality of illumination elements is configured to emit a first amount of light based, at least in part, on a determined reflectivity value for the first object;
the second portion of the plurality of illumination elements is configured to emit a second amount of light based, at least in part, on a determined reflectivity value for the second object; and
the first amount of light and the second amount of light are different.

34. The light source module of clause 28, wherein:
the first amount of light is inversely proportional to the determined reflectivity value for the first object; and
the second amount of light is inversely proportional to the determined reflectivity value for the second object.

35. A method comprising:
configuring a light source module during capture of an image by an image capture device, wherein the light source module comprises a plurality of illumination elements configured to emit light, and wherein the configuring comprises:
  evaluating light emitted by the plurality of illumination elements, reflected by one or more objects and detected at the image capture device to determine respective reflectivity values for the one or more objects;
  determining an illumination pattern for the light source module based, at least in part, on the respective reflectivity values determined for the one or more objects; and
  causing individual ones of the plurality of illumination elements to respectively emit light to generate the determined illumination pattern, wherein the individual ones of the plurality of illumination elements are respectively configured to emit different amounts of light based, at least in part, on the respective reflectivity values determined for the one or more objects.

36. The method of clause 35, wherein:
the one or more objects comprise a foreground object and a bounce object;
light emitted by a first portion of the plurality of illumination elements is reflected by the bounce object to the foreground object, then reflected from the foreground object to the image capture device;
additional light emitted by a second portion of the plurality of illumination elements is reflected by the foreground object to the image capture device;
the illumination pattern for the light source module illuminates the foreground object;
the first portion of the plurality of illumination elements is configured to emit a first amount of light based, at least in part, on a reflectivity value for the bounce object; and
the second portion of the plurality of illumination elements is configured to emit a second amount of light different from the first amount of light.

37. The method of clause 36, wherein:
the light source module further comprises an adjustable lens configured to project the emitted light of the plurality of illumination elements;
the bounce object is outside a field of view of the image capture device; and
the method further comprises adjusting the adjustable lens to a field of illumination that includes the bounce object.

38. The method of clause 36, wherein:
the bounce object is identified using respective depth values determined for the bounce object and the foreground object.

39. The method of clause 36, wherein:
the first amount of light and the second amount of light are respectively determined according to a configured ratio of direct and indirect lighting.

40. The method of clause 35, wherein:
light emitted by a first portion of the plurality of illumination elements is reflected by a first object of the one or more objects to the image capture device;
light emitted by a second portion of the plurality of illumination elements is reflected by a second object of the one or more objects to the image capture device;
the first portion of the plurality of illumination elements is configured to emit a first amount of light inversely proportional to a determined reflectivity value for the first object;
the second portion of the plurality of illumination elements is configured to emit a second amount of light inversely proportional to a determined reflectivity value for the second object; and
the first amount of light and the second amount of light are different.

Multifunction Device Examples

Embodiments of electronic devices in which embodiments of light source modules, camera modules, light diffusion control modules, etc. as described herein may be used, user interfaces for such devices, and associated processes for using such devices are described. As noted above, in some embodiments, light source modules, camera modules, light diffusion control modules, etc. can be included in a mobile computing device which can include a camera device. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 28:
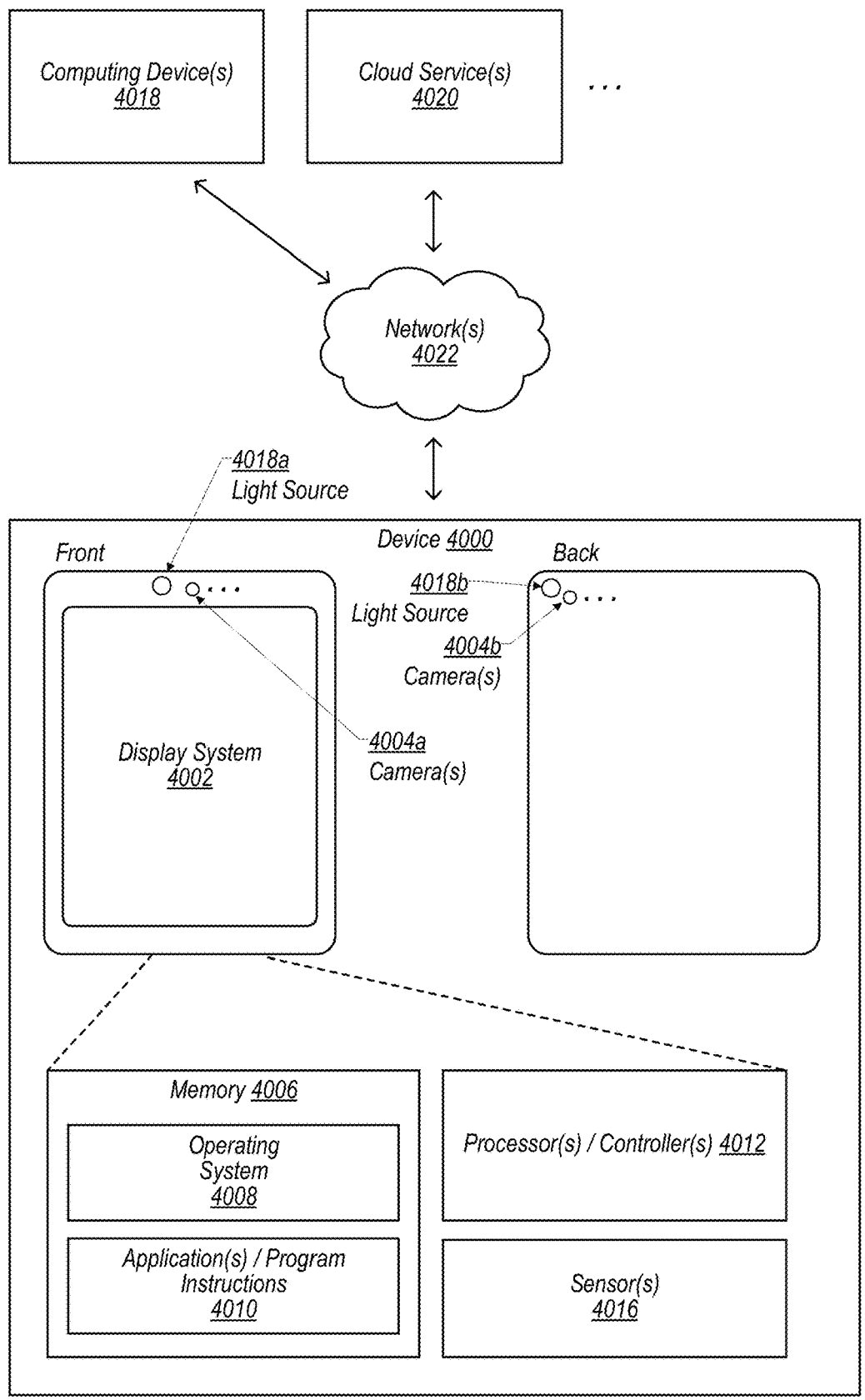
FIG. 28 illustrates a portable multifunction device with an embedded light source module, according to some embodiments.

FIG. 28 illustrates a schematic representation of an example device 4000 that may include a camera and illumination array, e.g., as described herein with reference to FIGS. 1-27, according to some embodiments. In some embodiments, the device 4000 may be a mobile device and/or a multifunction device. In various embodiments, the device 4000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 4000 may include a display system 4002 (e.g., comprising a display and/or a touch-sensitive surface) and/or one or more cameras 4004. In some non-limiting embodiments, the display system 4002 and/or one or more front-facing cameras 4004a may be provided at a front side of the device 4000, e.g., as indicated in FIG. 28. Additionally, or alternatively, one or more rear-facing cameras 4004b may be provided at a rear side of the device 4000. In some embodiments comprising multiple cameras 4004, some or all of the cameras may be the same as, or similar to, each other. Additionally, or alternatively, some or all of the cameras may be different from each other. In various embodiments, the location(s) and/or arrangement(s) of the camera(s) 4004 may be different than those indicated in FIG. 28. Additionally, the device 4000 may include light source modules 4018a and/or 4018b, which may be similar to illumination module 100 described in FIG. 1 and light source module 220 described in FIG. 2. In some embodiments, a controller for the light source module may be implemented in software or hardware on the device 4000.

Among other things, the device 4000 may include memory 4006 (e.g., comprising an operating system 4008 and/or application(s)/program instructions 4010), one or more processors and/or controllers 4012 (e.g., comprising CPU(s), memory controller(s), display controller(s), and/or camera controller(s), etc.), and/or one or more sensors 4016 (e.g., orientation sensor(s), proximity sensor(s), and/or position sensor(s), etc.). In some embodiments, the device 4000 may communicate with one or more other devices and/or services, such as computing device(s) 4018, cloud service(s) 4020, etc., via one or more networks 4022. For example, the device 4000 may include a network interface (e.g., network interface 4210) that enables the device 4000 to transmit data to, and receive data from, the network(s) 4022. Additionally, or alternatively, the device 4000 may be capable of communicating with other devices via wireless communication using any of a variety of communications standards, protocols, and/or technologies.

Figure 29:
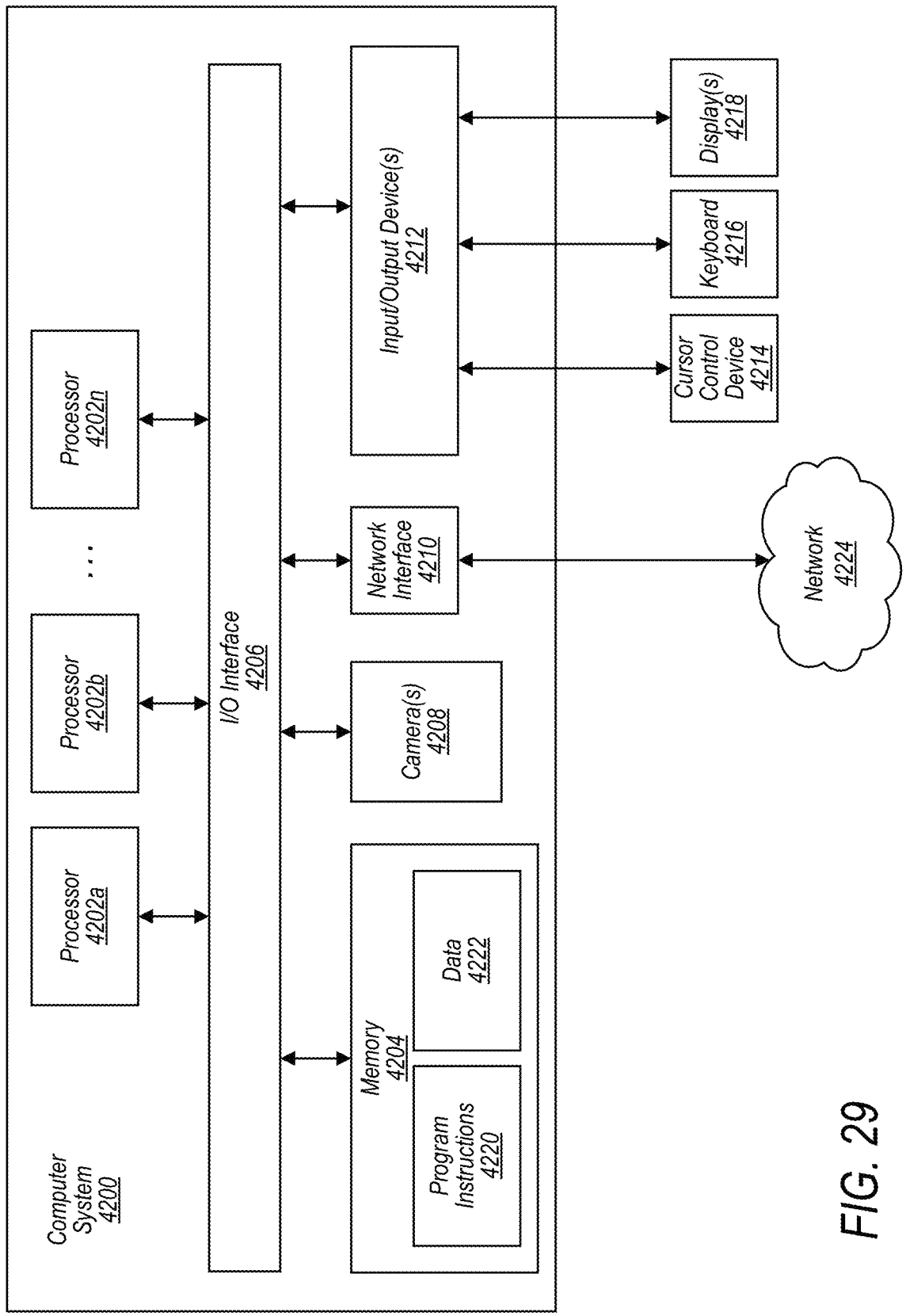
FIG. 29 illustrates an example computer system, according to some embodiments.

FIG. 29 illustrates a schematic block diagram of an example computing device, referred to as computer system 4200, that may include or host embodiments of a camera an illumination array module, e.g., as described herein with reference to FIGS. 1-28, according to some embodiments. In addition, computer system 4200 may implement methods for controlling operations of the camera and/or for performing image processing images captured with the camera. In some embodiments, the device 4000 (described herein with reference to FIG. 28) may additionally, or alternatively, include some or all of the functional components of the computer system 4200 described herein.

The computer system 4200 may be configured to execute any or all of the embodiments described above. In different embodiments, computer system 4200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 4200 includes one or more processors 4202 coupled to a system memory 4204 via an input/output (I/O) interface 4206. Computer system 4200 further includes one or more cameras 4208 coupled to the I/O interface 4206 (and associated light source modules). Computer system 4200 further includes a network interface 4210 coupled to I/O interface 4206, and one or more input/output devices 4212, such as cursor control device 4214, keyboard 4216, and display(s) 4218.

In various embodiments, computer system 4200 may be a uniprocessor system including one processor 4202, or a multiprocessor system including several processors 4202 (e.g., two, four, eight, or another suitable number). Processors 4202 may be any suitable processor capable of executing instructions. For example, in various embodiments processors 4202 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 4202 may include additional types of processors, such as graphics processing units (GPUs), application specific integrated circuits (ASICs), etc. In multiprocessor systems, each of processors 4202 may commonly, but not necessarily, implement the same ISA. In some embodiments, computer system 4200 may be implemented as a system on a chip (SoC). For example, in some embodiments, processors 4202, memory 4204, I/O interface 4206 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 4204 may be configured to store program instructions 4220 accessible by processor 4202. In various embodiments, system memory 4204 may be implemented using any suitable memory technology, such as static random-access memory (SRAM), synchronous dynamic RAM (SDRAM), nonvolatile/Flash-type memory, or any other type of memory. Additionally, existing camera control data 4222 of memory 4204 may include any of the information or data structures described above. In some embodiments, program instructions 4220 and/or data 4222 may be received, sent or stored upon different types of computer-accessible media or on similar media separate from system memory 4204 or computer system 4200. In various embodiments, some or all of the functionality described herein may be implemented via such a computer system 4200.

In one embodiment, I/O interface 4206 may be configured to coordinate I/O traffic between processor 4202, system memory 4204, and any peripheral devices in the device, including network interface 4210 or other peripheral interfaces, such as input/output devices 4212. In some embodiments, I/O interface 4206 may perform any necessary protocol, timing or other data transformations to convert data signals from one component (e.g., system memory 4204) into a format suitable for use by another component (e.g., processor 4202). In some embodiments, I/O interface 4206 may include support for devices attached through various types of peripheral buses, such as a variant of the Peripheral Component Interconnect (PCI) bus standard or the Universal Serial Bus (USB) standard, for example. In some embodiments, the function of I/O interface 4206 may be split into two or more separate components, such as a north bridge and a south bridge, for example. Also, in some embodiments some or all of the functionality of I/O interface 4206, such as an interface to system memory 4204, may be incorporated directly into processor 4202.

Network interface 4210 may be configured to allow data to be exchanged between computer system 4200 and other devices attached to a network 4224 (e.g., carrier or agent devices) or between nodes of computer system 4200. Network 4224 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 4210 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 4212 may, in some embodiments, include one or more display terminals, keyboards, keypads, touchpads, scanning devices, voice or optical recognition devices, or any other devices suitable for entering or accessing data by one or more computer systems 4200. Multiple input/output devices 4212 may be present in computer system 4200 or may be distributed on various nodes of computer system 4200. In some embodiments, similar input/output devices may be separate from computer system 4200 and may interact with one or more nodes of computer system 4200 through a wired or wireless connection, such as over network interface 4210.

Those skilled in the art will appreciate that computer system 4200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 4200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 4200 may be transmitted to computer system 4200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A mobile computing device, comprising:
a camera arrangement comprising:
an image capture device;
a plurality of illumination elements configured to emit light;
a lens configured to project the emitted light of the plurality of illumination elements according to a field of illumination; and
a controller, wherein during capture of an image by the image capture device, the controller is configured to:
determine the field of illumination and an associated illumination pattern based, at least in part, on a profile of the image capture device, the profile comprising a field of view and an illumination sensitivity model; and
cause individual ones of the plurality of illumination elements to respectively emit light through the lens to generate the determined illumination pattern, wherein the individual ones of the plurality of illumination elements are respectively configured to emit different amounts of light based, at least in part, on the illumination sensitivity model of the profile for the image capture device.

2. The mobile computing device of claim 1, wherein:
the image capture device comprises an imaging lens and an imaging sensor;
the field of view of the profile is determined by a focal length of the imaging lens, a size of the imaging sensor; and
the illumination sensitivity model of the profile is based, at least in part, on one or more characteristics of an image rendered by the imaging lens onto the imaging sensor.

3. The mobile computing device of claim 2, wherein the field of view of the profile is further determined based on a user-defined crop or zoom.

4. The mobile computing device of claim 3, wherein:
the image capture device is configured to provide a plurality of zoom levels;
the profile of the image capture device is one of a plurality of profiles determined according to respective configured zoom level of the image capture device;
the field of view of the profile is determined by a configured zoom level of the image capture device; and
the illumination sensitivity model of the profile is based, at least in part, on the one or more characteristics of the image rendered by the imaging lens onto the imaging sensor at the configured zoom level; wherein respective sensitivity models of respective profiles of the plurality of profiles determined at different zoom levels are different.

5. The mobile computing device of claim 2, wherein the one or more characteristics of the image rendered by the imaging lens onto the imaging sensor comprise at least a vignetting characteristic associated with the imaging lens.

6. The mobile computing device of claim 1, wherein the plurality of illumination elements is a two-dimensional array of illumination elements.

7. The mobile computing device of claim 1, wherein the controller is further configured to determine the illumination pattern according to one or more objects identified in the field of view of the image capture device.

8. A light source module, comprising:
a plurality of illumination elements configured to emit light;
a lens configured to project the emitted light of the plurality of illumination elements according to a field of illumination; and
a controller, wherein during capture of an image by an imaging device, the controller is configured to:
determine the field of illumination and an associated illumination pattern for the light source module based, at least in part, on a profile of the imaging device, the profile comprising a field of view and an illumination sensitivity model; and
cause individual ones of the plurality of illumination elements to respectively emit light through the lens to generate the determined illumination pattern, wherein the individual ones of the plurality of illumination elements are respectively configured to emit different amounts of light based, at least in part, on the illumination sensitivity model of the profile for the imaging device.

9. The light source module of claim 8, wherein:
the lens is an adjustable lens; and
the controller, during capture of an image by an imaging device, is further configured to adjust the adjustable lens to the determined field of illumination based, at least in part, on the field of view of the profile for the imaging device.

10. The light source module of claim 8, wherein:
the imaging device comprises an imaging lens and an imaging sensor;
the field of view of the profile is determined by a focal length of the imaging lens and a size of the imaging sensor; and
the illumination sensitivity model of the profile is based, at least in part, on one or more characteristics of an image rendered by the imaging lens onto the imaging sensor.

11. The light source module of claim 10, wherein the field of view of the profile is further determined based on a user-defined crop or zoom.

12. The light source module of claim 11, wherein:
the imaging lens is configured to provide a plurality of zooms;
the profile of the imaging device is one of a plurality of profiles determined according to respective configured zooms of the imaging device;
the field of view of the profile is determined by a configured zoom of the imaging device; and
the illumination sensitivity model of the profile is based, at least in part, on the one or more characteristics of the image rendered by the imaging lens onto the imaging sensor at the configured zoom; wherein respective sensitivity models of respective profiles of the plurality of profiles determined at different zooms are different.

13. The light source module of claim 11, wherein the one or more characteristics of the image rendered by the imaging lens onto the imaging sensor comprise at least a vignetting characteristic associated with the imaging lens.

14. The light source module of claim 10, wherein to determine the field of illumination and the associated illumination pattern for the light source module, the controller is configured to evaluate a focusing distance of the imaging lens and a crop of the imaging sensor.

15. The light source module of claim 8, wherein the plurality of illumination elements is a two-dimensional array of illumination elements.

16. The light source module of claim 8, wherein the controller is further configured to determine the illumination pattern according to one or more objects identified in the field of view of the imaging device.

17. A method comprising:
configuring a light source module during capture of an image by an imaging device, wherein the light source module comprises a plurality of illumination elements configured to emit light and a lens configured to project the emitted light of the plurality of illumination elements, and wherein the configuring comprises:
determining a field of illumination and an associated illumination pattern for the light source module based, at least in part, on a profile of the imaging device, the profile comprising a field of view and an illumination sensitivity model; and
causing individual ones of the plurality of illumination elements to respectively emit light through the lens to generate the determined illumination pattern, wherein the individual ones of the plurality of illumination elements are respectively configured to emit different amounts of light based, at least in part, on the illumination sensitivity model of the profile for the imaging device.

18. The method of claim 17, wherein:
the imaging device comprises an imaging lens and an imaging sensor;
the field of view of the profile is determined by a focal length of the imaging lens and a size of the imaging sensor; and
the illumination sensitivity model of the profile is based, at least in part, on one or more characteristics of an image rendered by the imaging lens onto the imaging sensor.

19. The method of claim 18, wherein to determine the field of illumination and the associated illumination pattern for the light source module, a controller is configured to evaluate a focusing distance of the imaging lens, and a crop of the imaging sensor.

20. The method of claim 17, further comprising:
configuring the light source module during adding light to an environment as a flashlight, wherein the configuring comprises:
determining a field of illumination and an associated illumination pattern for the light source module based, at least in part, on a user's intended beam width, pattern, or intensity as indicated to a controller through a graphical user input; and
causing individual ones of the plurality of illumination elements to respectively emit light through the lens to generate the determined illumination pattern, wherein the individual ones of the plurality of illumination elements are respectively configured to emit different amounts of light based, at least in part, on the user's intended beam width, pattern, or intensity that were sent to the controller through the graphical user input.

* * * * *